(12) United States Patent
Ohashi et al.

(10) Patent No.: US 8,928,195 B2
(45) Date of Patent: Jan. 6, 2015

(54) ROTARY MACHINE

(75) Inventors: Satoru Ohashi, Tokyo (JP); Norihisa Handa, Tokyo (JP); Shusaku Yamasaki, Tokyo (JP); Masahiro Tanida, Tokyo (JP); Koushi Ishimoto, Tokyo (JP); Motoaki Shito, Tokyo (JP)

(73) Assignee: IHI Corporation, Tokyo (JP)

( * ) Notice: Subject to any disclaimer, the term of this patent is extended or adjusted under 35 U.S.C. 154(b) by 173 days.

(21) Appl. No.: 13/642,328

(22) PCT Filed: Apr. 22, 2011

(86) PCT No.: PCT/JP2011/059976
§ 371 (c)(1),
(2), (4) Date: Oct. 19, 2012

(87) PCT Pub. No.: WO2011/132784
PCT Pub. Date: Oct. 27, 2011

(65) Prior Publication Data
US 2013/0038151 A1 Feb. 14, 2013

(30) Foreign Application Priority Data

Apr. 23, 2010 (JP) .................................. 2010-099805
Dec. 22, 2010 (JP) .................................. 2010-286586
Mar. 25, 2011 (JP) .................................. 2011-068204

(51) Int. Cl.
*H02K 1/32* (2006.01)
*H02K 9/19* (2006.01)
*H02K 9/197* (2006.01)
*H02K 1/27* (2006.01)
*H02K 5/128* (2006.01)

(52) U.S. Cl.
CPC .................. *H02K 9/197* (2013.01); *H02K 9/19* (2013.01); *H02K 1/276* (2013.01); *H02K 1/32* (2013.01); *H02K 5/128* (2013.01)

USPC .............. 310/54; 310/58; 310/59; 310/60 A; 310/60 R; 310/61

(58) Field of Classification Search
None
See application file for complete search history.

(56) References Cited

U.S. PATENT DOCUMENTS 5,019,733 A * 5/1991 Kano et al. ....................... 310/61
5,189,325 A * 2/1993 Jarczynski ....................... 310/54

(Continued)

FOREIGN PATENT DOCUMENTS

CN          1398452 A     2/2003
JP        52-108511 U     8/1977

(Continued)

OTHER PUBLICATIONS

International Search Report Issued Jul. 19, 2011 in PCT/JP11/59976 Filed Apr. 22, 2011.

(Continued)

*Primary Examiner* — Tran Nguyen
(74) *Attorney, Agent, or Firm* — Oblon, Spivak, McClelland, Maier & Neustadt, L.L.P.

(57) ABSTRACT

On an inner circumference side of a stator fixed in an inner housing, a rotor is arranged. The rotor rotates through a bearing with respect to a center shaft that is a stationary shaft fixed to outer housings. Oil introduced into a rotor oil inlet path in the center shaft flows through a communication path and a clearance on an outer circumference of the center shaft into an oil path in the rotor. The oil flowing through the oil path cools a permanent magnet, lubricates the bearing, and is discharged from a rotor oil discharge port to the outside of the inner housing. The oil in the clearance is sealed with a thread seal, i.e., an inner thread formed in an inner face of an end ring and is prevented from flowing toward the bearing.

12 Claims, 14 Drawing Sheets

(56) References Cited

U.S. PATENT DOCUMENTS

| | | | |
|---|---|---|---|
| 6,727,609 B2* | 4/2004 | Johnsen | 310/52 |
| 6,772,504 B2* | 8/2004 | Weidman et al. | 29/598 |
| 6,879,069 B1* | 4/2005 | Weidman et al. | 310/61 |
| 7,088,021 B2* | 8/2006 | Kobayashi et al. | 310/52 |
| 7,462,963 B2* | 12/2008 | Ishihara et al. | 310/58 |
| 2003/0132673 A1* | 7/2003 | Zhou et al. | 310/54 |

FOREIGN PATENT DOCUMENTS

| | | |
|---|---|---|
| JP | 61 92166 | 6/1986 |
| JP | 2 14287 | 1/1990 |
| JP | 2716286 | 2/1998 |
| JP | 2002 325394 | 11/2002 |
| JP | 2002 345188 | 11/2002 |
| JP | 2003-224945 A | 8/2003 |
| JP | 2003 289650 | 10/2003 |
| JP | 2004-180376 A | 6/2004 |
| JP | 2004 208463 | 7/2004 |
| JP | 2005 278319 | 10/2005 |
| JP | 2005-328689 A | 11/2005 |
| JP | 2005-354821 A | 12/2005 |
| JP | 2006-197774 A | 7/2006 |
| JP | 4100170 | 6/2008 |
| JP | 2008 178243 | 7/2008 |
| JP | 2009 27837 | 2/2009 |
| JP | 4469670 | 5/2010 |
| JP | 2010 213413 | 9/2010 |
| JP | 2010 220340 | 9/2010 |
| JP | 2010-226903 A | 10/2010 |
| JP | 2010 252544 | 11/2010 |

OTHER PUBLICATIONS

Office Action issued Jun. 3, 2014 in Japanese Patent Application No. 2012-549649 (with English language translation).

Office Action issued Jun. 3, 2014 in Japanese Patent Application No. 2012-549650 (with English language translation).

Office Action issued Jun. 30, 2014 in Chinese Patent Application No. 201180019748.0.

* cited by examiner

OIL FLOWING DIRECTION

⊙ FROM BACK FACE TO SURFACE OF DRAWING
⊗ FROM SURFACE TO BACK FACE OF DRAWING

FIG.8
(a)
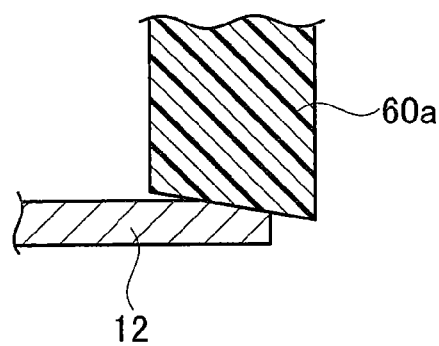
(b)
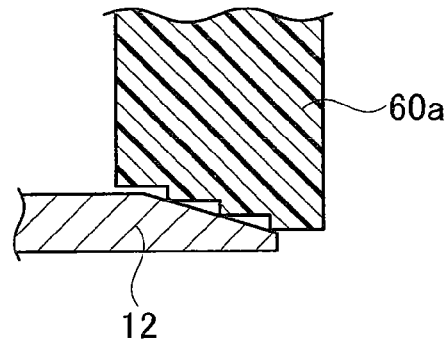
(c)
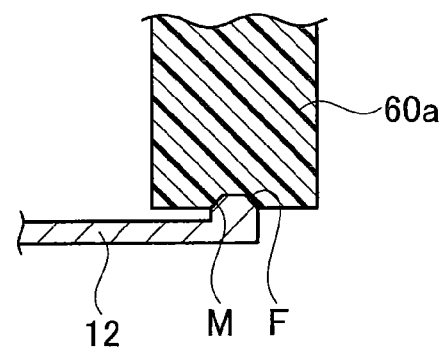
(d)
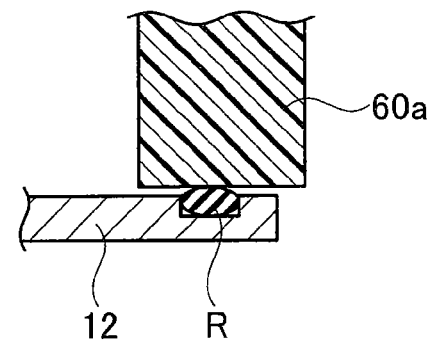
(e)
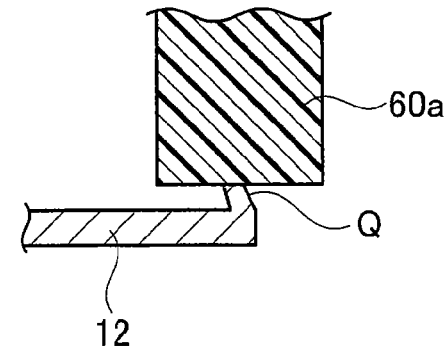
(f)
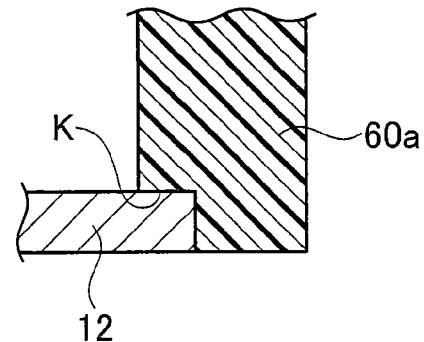

FIG.13
(a) 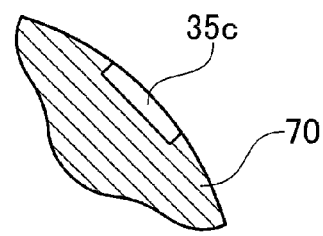
(b) 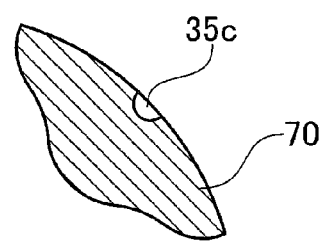
(c) 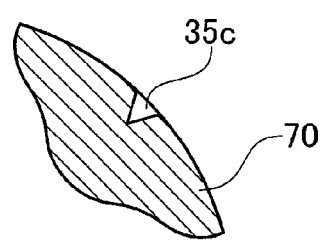
(d) 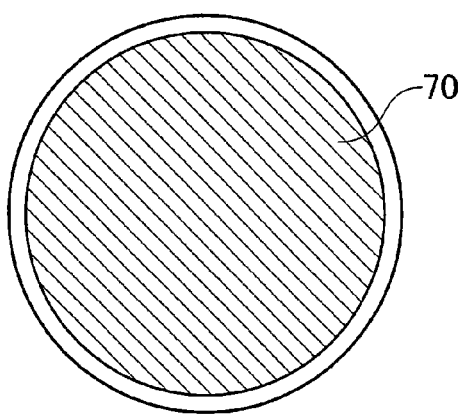

ROTARY MACHINE

TECHNICAL FIELD

The present invention relates to a rotary machine employing a coolant to cool a motor.

BACKGROUND ART

Cooling a rotary machine used for an electric vehicle with the use of a coolant is useful to maintain a rotor and stator at a proper temperature and efficiently generate driving force (torque) from electric power. A related art is disclosed in Japanese Unexamined Patent Application Publication No. 2005-278319.

CITATION LIST

Patent Literature

Patent Literature 1: Japanese Unexamined Patent Application Publication No. 2005-278319

SUMMARY OF INVENTION

Problems to be Solved by Invention

In connection with using a coolant to cool a rotary machine, the present inventors have studied the detailed structure of a rotary machine to improve cooling efficiency. During the studying process, it has been found that the sealing ability of a rotor and stator with respect to a coolant greatly influences the efficiency of the rotary machine of converting electric power into driving force (torque). The present invention has been made in consideration of the issue and an object of the invention is to provide a rotary machine that efficiently converts electric power into torque, or torque into electric power.

Means to Solve Problem

An aspect of the present invention provides a rotary machine including: a housing in which a stator is fixed; an outer housing attached to an outer side of the housing; a rotor shaft that horizontally passes through the housing and has both ends fixed to the outer housing; a rotor that is arranged inside the housing, is supported to be rotatable relative to the rotor shaft, and is rotated by the stator; a rotor shaft coolant path that is formed inside the rotor shaft and includes an inlet exposed to the outside of the outer housing to take in a coolant from the outside of the rotor shaft and an exit communicating with an annular clearance between the rotor shaft and the rotor to pass the coolant taken in from the inlet to the annular clearance; and a rotor coolant path that is formed inside the rotor and includes an intake communicating with the annular clearance and a discharge port arranged outside the housing to discharge the coolant taken through the intake to a space between the housing and the outer housing.

Effects of Invention

According to the rotary machine of the present invention, a coolant passes through the rotor shaft coolant path, guided into the inlet, and discharged from the discharge port positioned outside the housing in which the stator is fixed to the space between the housing and the outer housing that is outside the housing. This surely seals the stator fixed inside the housing against the coolant that cools the rotor.

BRIEF DESCRIPTION OF DRAWINGS

FIG. 8 is an explanatory view illustrating a sealing method using a stator seal of FIG. 5

FIG. 13 is sectional views illustrating sectional shapes of examples of a groove formed in the rotor of FIG. 10

DESCRIPTION OF EMBODIMENTS

First Embodiment

Figure 1:
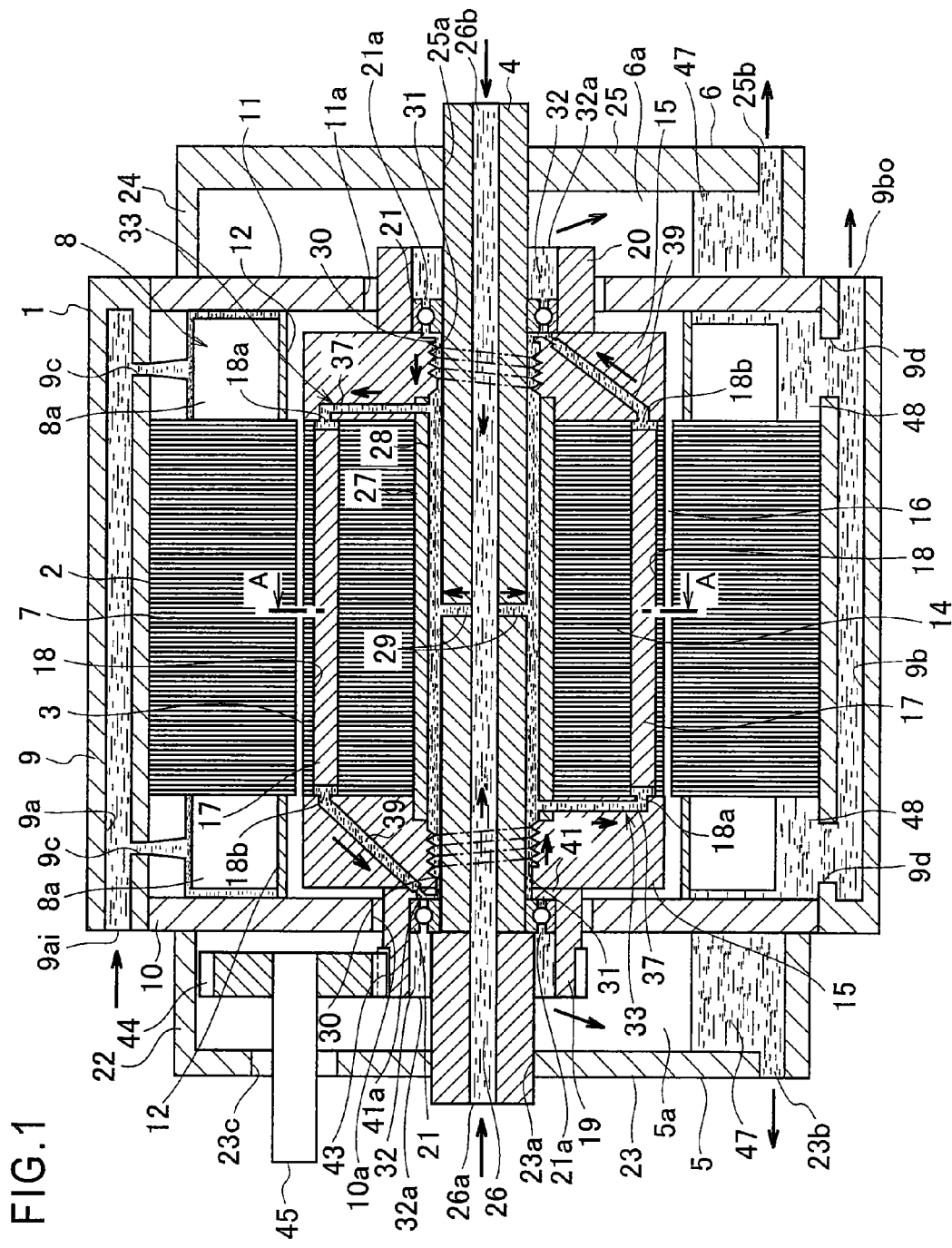
FIG. 1 is a sectional view illustrating a motor according to a first embodiment of the present invention

As illustrated in FIG. 1, an example of a rotary machine according to the first embodiment of the present invention is a motor of an electric vehicle. The motor has an inner housing 1 having an inner circumferential face to which a stator 2 is fixed. On an inner circumferential side of the stator 2, a rotor 3 is rotatably arranged. The rotor 3 is rotatable relative to a center shaft (rotor shaft) 4 that is a stationary shaft. Both ends of the center shaft 4 are fixed to outer housings 5 and 6 that are arranged at each side in an axial direction of the inner housing 1.

The "axial direction" mentioned above is an axial direction (left-right direction in FIG. 1) of the center shaft 4. The "axial direction" in the following explanation means the axial direction of the center shaft 4 if not particularly mentioned.

The stator 2 has a stator core 7 that is a layered body of a plurality of magnetic steel sheets made of magnetic material and a coil 8 that is inserted into a slot (not illustrated) formed in the stator core 7. The inner housing 1 has a cylindrical part 9 whose both axial ends are open and left and right side walls 10 and 11 that are arranged to close the open axial ends of the cylindrical part 9.

The stator core 7 is fixed to an inner circumferential face of the cylindrical part 9. At an upper part in a vertical direction of the cylindrical part 9, there is axially formed a stator oil inlet path 9a to guide oil serving as a coolant. At a lower part of the cylindrical part 9, there is axially formed a stator oil discharge path 9b to discharge the oil to the outside of the inner housing 1.

The "vertical direction" mentioned above is a top-bottom direction along plumb line in FIG. 1 that is perpendicular to the axial direction of the cylindrical part 9 that is horizontally arranged in the axial direction.

The stator oil inlet path 9a has an oil inlet 9ai at a first axial side on the left side of FIG. 1 and an oil outlet hole (coolant supply port) 9c formed in an inner wall of the cylindrical part 9 corresponding to the stator oil inlet path 9a, so that the oil introduced through the oil inlet 9ai is fed toward the stator 2. The oil feed hole 9c is formed at a location corresponding to a coil end 8a of the coil 8 protruding from the stator core 7 toward an axial end.

The stator oil discharge path 9b has an oil discharge port 9bo at a second axial side on the right side of FIG. 1 and an oil discharge hole 9d formed in the inner wall of the cylindrical part 9 corresponding to the stator oil discharge path 9b, to discharge oil on the stator 2 to the stator oil discharge path 9b. Like the oil feed hole 9c, the oil discharge hole 9d is formed at a location corresponding to the coil end 8a.

The oil discharge hole 9d has a larger diameter than the oil feed hole 9c. On the inner circumferential side (rotor 3 side) of the coil end 8a, there is a cylindrical stator seal (partition) 12 serving as a sealing member made of, for example, resin.

The rotor 3 positioned inside the stator 2 has a rotor core 14. Like the stator core 7, the rotor core 14 is a layered body of a plurality of magnetic steel sheets made of magnetic material. The rotor 3 also has an end ring 15 serving as an end member arranged at each end in the axial direction (a layered direction of the magnetic steel sheets) of the rotor core 14. Between an outer circumferential face of the rotor core 14 and an inner circumferential face of the stator core 7, an annular air gap 16 is formed.

Figure 2:
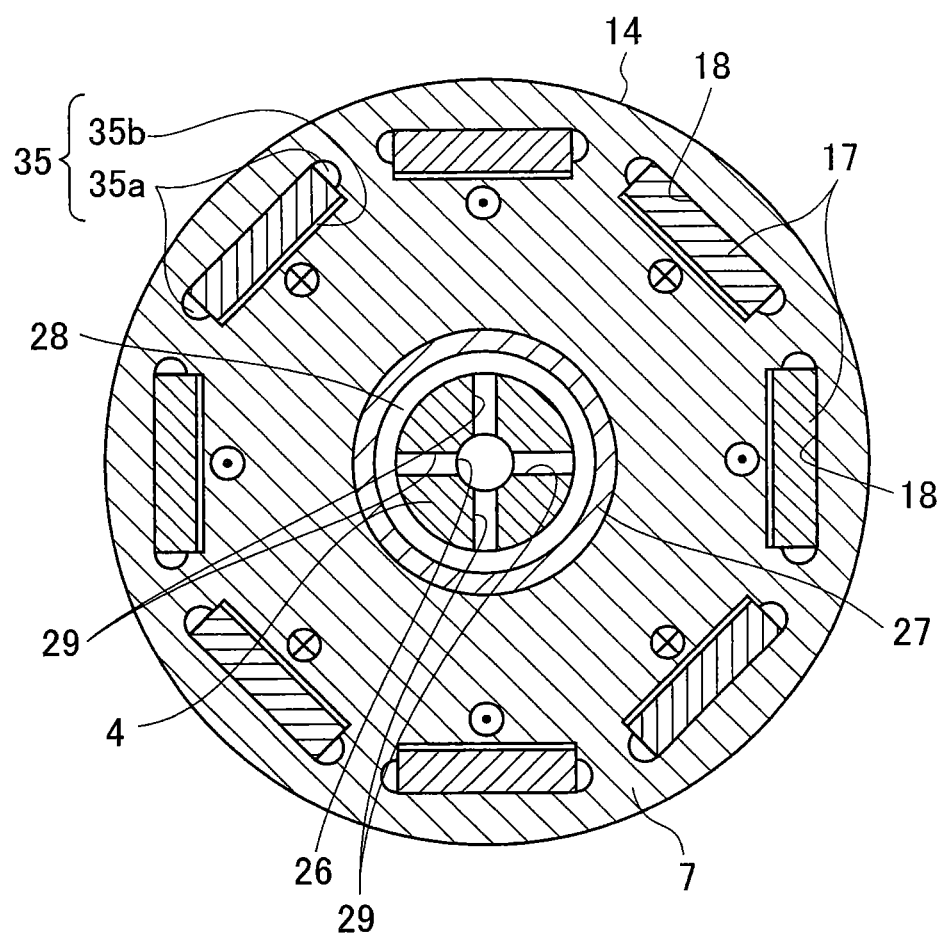
FIG. 2 illustrates an A-A section of FIG. 1
Figure 3:
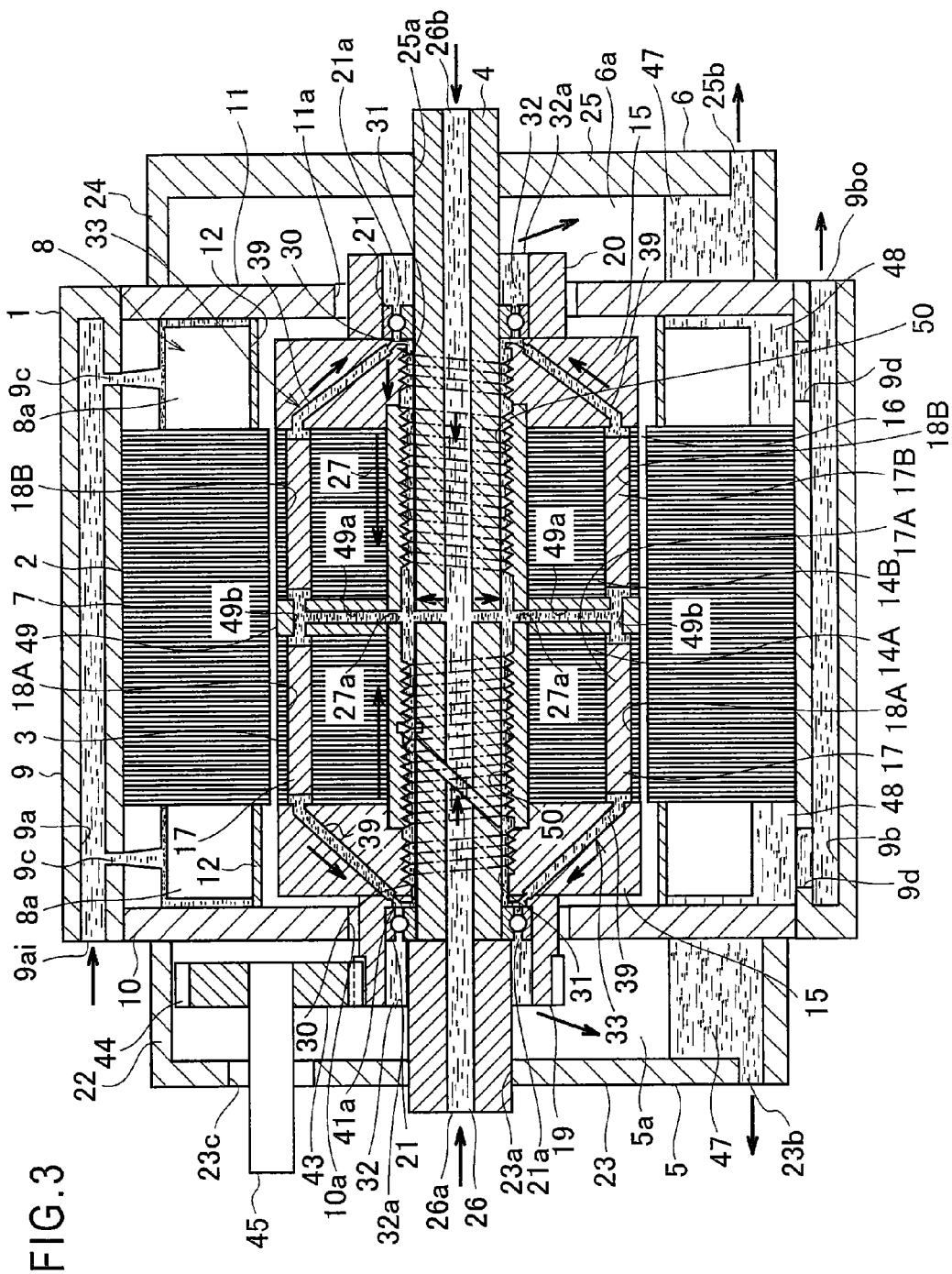
FIG. 3 is a sectional view illustrating a motor according to a second embodiment of the present invention

In the vicinity of the stator 2, the rotor core 14 embeds rectangular parallelepiped permanent magnets 17 in which each primary axis thereof is arranged in parallel with the axial direction. As illustrated in FIG. 2, the permanent magnets 17 are arranged at regular intervals in a circumferential direction of the circular rotor core 14 and are accommodated in and fixed to through holes 18 serving as accommodation holes axially formed through the rotor core 14.

Axial sides of the end rings 15 of the rotor core 14 are fixed to cylindrical rotary support members 19 and 20. The rotary support members 19 and 20 are inserted with proper clearances into openings 10a and 11a formed in central parts of the side walls 10 and 11 of the inner housing 1. In this state, the rotary support members 19 and 20 outwardly protrude in the axial direction and are rotatably supported with the center shaft 4 through bearings 21. The rotary support members 19 and 20 are included in the rotor 3.

The outer housing 5 that is on the left side of FIG. 1 to fixedly support a first end of the center shaft 4 has an outer cylindrical part 22 whose axial inner end is fixed to the side wall 10 of the inner housing 1 and an outer side wall 23 closing a side of the outer cylindrical part 22 opposite to the inner housing 1. At the center of the outer side wall 23, there is formed a fitting hole 23a to which the center shaft 4 is fixed with the first end thereof being protruding outside.

Similarly, the outer housing 6 that is on the right side of FIG. 1 to fixedly support a second end of the center shaft 4 has an outer cylindrical part 24 whose axial inner end is fixed to the side wall 11 of the inner housing 1 and an outer side wall 25 closing a side of the outer cylindrical part 24 opposite to the inner housing 1. At the center of the outer side wall 25, there is formed a fitting hole 25a to which the center shaft 4 is fixed with the second end thereof being protruding outside.

At the center of the center shaft 4, there is formed a rotor oil inlet path 26 that axially passes through the whole length of the center shaft 4 to introduce oil serving as a coolant. To the rotor oil inlet path 26, an oil supply unit such as an oil pump (not illustrated) supplies oil through end openings (inlets) 26a and 26b formed at both axial ends of the center shaft 4.

The rotor 3 has a center through hole into which the center shaft 4 is inserted. An inner wall of the center through hole is fixed to a cylindrical sleeve 27 that extends along the rotor core 14 and partly along the end rings 15 that are present on each axial side of the rotor core 14. Between an inner circumferential face of the sleeve 27 and an outer circumferential face of the center shaft 4, there is formed an annular gap (annular clearance) 28. At locations of the center shaft 4 corresponding to an axial center of the rotor 3, a plurality of (for example, four) communication paths (exits) are arranged at regular intervals in a circumferential direction, to serve as feed ports that connect the clearance 28 to the rotor oil inlet path (rotor shaft coolant path) 26.

Between the center shaft 4 and each of the left and right end rings 15 located on the axially outer side of the sleeve 27, there is formed an annular gap 30. On an inner circumferential face of each end ring 15 corresponding to the gap 30, there is formed an inner thread (spiral groove) 31 serving as a spiral part. Each thread 31 forms a thread seal that transports oil along the inner thread toward the axial center when the rotor 3 with the end rings 15 turn, thereby preventing oil from flowing toward the axial outside.

Each of the left and right gaps 30 communicates through an inner space 21a of the bearing 21 with an annular gap 32 between the rotary support member 19 (20) and the center shaft 4. The gap 32 has a rotor oil discharge port 32a that is located outside the inner housing 1 and is open to the space 5a (6a) between the outer housing 5 (6) and the inner housing 1, i.e., the space between the housing and the outer housing, to serve as a coolant discharge port. At lower ends of the outer side walls 23 and 25 of the outer housings 5 and 6, there are formed rotor oil discharge holes 23b and 25b, respectively.

The clearance 28 in the vicinity of an axial inner side of one of the left and right inner threads 31 is connected through an oil path (coolant path) 33 formed inside the rotor 3 to the vicinity of an axial inner side of the bearing 21 adjacent to the other inner thread 31.

A plurality of the oil paths 33 are formed in a circumferential direction corresponding to the through holes (accommodation holes) 18 accommodating the permanent magnets 17. The oil path 33 includes a gap path 35 (FIG. 2) formed around the permanent magnet 17 in the through hole 18, an inlet path (entry) 37 formed in the end ring 15 upstream from the gap path 35, and an outlet path 39 formed in the other end ring 15 downstream from the gap path 35.

As illustrated in FIG. 2, the gap path 35 has semicircular paths 35a formed to face part of circumferential end faces of the permanent magnet 17 and a flat path 35b formed to face an inner side face of the permanent magnet 17. The semicircular paths 35a are naturally formed when the permanent magnet 17 is accommodated in and fixed to the through hole 18. The flat path 35b may not particularly be formed.

The inlet path 37 extends between the inner thread 31 and the rotor core 14 from the sleeve 27 along the end ring 15 in a radial direction of the center shaft 4. A downstream end of the inlet path 37 communicates with an end opening 18a of the through hole 18. An upstream end of the outlet path 39 communicates with an end opening 18b of the through hole 18 and is inclined in the end ring 15 from the communicating part toward the bearing 21, so that a downstream end of the outlet path 39 opens to the axial inner side of the bearing 21. Accordingly, the inner space 21a of the bearing 21 communicates with the outlet path 39. The oil path 33 including the outlet path 39, the inner space 21a of the bearing 21, and the rotor oil discharge port 32a form a rotor coolant path.

The plurality of oil paths 33 arranged in the circumferential direction of the rotor 3 include those having the inlet paths 37 in the right end ring 15 and the outlet paths 39 in the left end ring 15 (as illustrated in an upper part of FIG. 1) and those having the inlet paths 37 in the left end ring 15 and the outlet paths 39 in the right end rings 15 (as illustrated in a lower part of FIG. 1), these two kinds of the oil paths 33 being alternately arranged in the circumferential direction of the rotor 3.

Accordingly, oil flowing through the oil paths 33 is divided into two flow systems that are alternated in the circumferential direction, one flowing from the surface to the back face of FIG. 2 and the other flowing from the back face to the surface of FIG. 2.

In FIG. 1, the right rotary support member 20 has a simple cylindrical shape. On the other hand, the left rotary support member 19 has a side plate 41 fixed to the end ring 15. Through an oil hole 41a formed in the side plate 41, the outlet path 39 communicates with an axial inner periphery of the bearing 21.

An outer end circumference of the rotary support member 19 adjacent to the rotor oil discharge port 32a is provided with an external gear 43 meshing with an output gear 44. The output gear 44 is connected to an output shaft 45. The output shaft 45 protrudes outside from an opening 23c formed in the outer side wall 23 of the outer housing 5 and is connected to, for example, a differential mechanism of the electric vehicle.

In the motor of such a configuration, the coil 8 of the stator 2 is energized to rotate the rotor 3 relative to the stator 2. At this time, the coil 8 of the stator 2 and the permanent magnets 17 of the rotor 3 generate heat.

When the motor is driven, an oil supply unit such as an oil pump (not illustrated) supplies oil to the rotor oil inlet path 26 of the center shaft 4. The oil is also supplied to the stator oil inlet path 9a formed in the cylindrical part 9 of the inner housing 1.

The oil introduced from the end openings 26a and 26b into the rotor oil inlet path 26 flows from the communication path 29 to the clearance 28 on the outer circumference of the center shaft 4 and axially outwardly flows through the clearance 28 into the inlet path 37 adjacent to the inner thread 31. At this time, the oil flowing through the clearance 28 toward the inlet path 37 is pressurized in an axial inward direction due to the rotation of the inner thread 31 according to the rotation of the rotor 3, and therefore, is prevented from axially outwardly moving toward the bearing 21. Namely, the oil is sealed.

Due to the sealing, the pressure of the oil in the clearance 28 is maintained and this pressure causes the oil in the inlet path 37 to pass through the gap path 35 formed around the permanent magnet 17 in the through hole 18, thereby cooling the heat generating permanent magnet 17. After cooling the permanent magnet 17, the oil flows through the outlet path 39 to around the bearing 21, and flows into the inner space 21a of the bearing 21, thereby lubricating the bearing 21. At this time, the oil supplied to the bearing 21 is the oil that has removed heat from the rotor 3, in particular, the permanent magnet 17, and therefore, has an increased temperature and a decreased viscosity. This reduces the frictional resistance and mechanical loss of the bearing 21, to improve the efficiency of the motor.

The oil supplied to the bearing 21 flows from the rotor oil discharge port 32a of the rotary support member 19 (20) into the outer housing 5 (6) and forms an outer housing oil pool 47 at a lower part of the outer housing. Thereafter, the oil is discharged outside from the rotor oil discharge hole 23b (25b).

On the other hand, the oil introduced from the oil inlet 9ai into the stator oil inlet path 9a of the inner housing 1 drops from the oil feed hole 9c onto the coil end 8a, to cool the stator 2, in particular, the coil 8. Thereafter, the oil forms an inner housing oil pool 48 at a lower part of the inner housing. The oil in the inner housing oil pool 48 flows from the oil discharge holes 9d into the stator oil discharge path 9b and is discharged outside from the oil discharge port 9bo.

In the case of the electric vehicle according to this embodiment, the oil that has cooled the rotor 3 and stator 2 and has been discharged outside is returned to an oil tank (not illustrated), is cooled, and is recirculated.

According to the motor cooling structure of the first embodiment explained above, the oil introduced into the center shaft 4 is passed from the communication path 29 of the center shaft 4 to the clearance 28 on the outer circumference of the center shaft 4 and to the oil path 33 in the rotor 3, thereby efficiently suppressing a temperature increase of the heat generating rotor 3 and permanent magnets 17 and preventing demagnetization of the permanent magnets 17.

At this time, the oil passed through the oil path 33 is discharged into the outer housings 5 and 6 outside the inner housing 1 having the stator 2 on the inner circumferential side thereof. This prevents the oil from entering the air gap 16 between the rotor 3 and the stator 2 without a complicated sealing structure, thereby reducing a motor loss.

Namely, the oil serving as a coolant to cool the rotor 3 flows through the rotor coolant path including the oil path 33, the inner space 21a of the bearing 21, and the rotor oil discharge port 32a. The rotor oil discharge port 32a is located outside the inner housing 1 in which the stator 2 is fixed. The oil flowed through the rotor coolant path is discharged from the rotor oil discharge port 32a into the space 5a (6a) between the inner housing 1 and the outer housing 5 (6) that is on the outer side of the inner housing 1.

As a result, the oil flowing through the rotor coolant path can surely be sealed against the stator 2 in the inner housing 1 without using a sealing structure. This secures the air gap 16 between the stator 2 and the rotor 3.

According to the motor structure of this embodiment, each rotor coolant path is formed with the use of the existing center shaft 4, end rings 15, rotor core 14, bearing 21, and rotary support member 19 (20) without adding new parts.

On the other hand, the oil introduced into the stator oil inlet path 9a of the inner housing 1 directly drops onto the stator 2, in particular, the coil ends 8a of the heat generating coil 8, to cool the same, suppress a temperature increase of the coil 8, and prevent a motor loss. The oil that has cooled the stator 2 including the coil 8 is prevented by the stator seal 12 from entering the air gap 16, thereby reducing a motor loss. The sealing structure with the stator seal 12 is realized only by arranging the cylindrical stator seal 12 on the inner circumferential side of the coil ends 8a, to isolate the coil 8 of the stator 2 from the rotor 3, and therefore, a complicated sealing structure is not particularly necessary.

According to this embodiment, the oil path 33 inside the rotor 3 is formed through the rotor core 14 having the permanent magnets 17 and the end rings 15 arranged at the axial ends of the rotor core 14. Due to this, no exclusive parts are needed to form the cooling path and only the existing motor parts are sufficient, thereby suppressing material costs.

According to this embodiment, the rotor core 14 is made of a layered body of a plurality of magnetic steel sheets and the oil path 33 is linearly formed through the rotor core 14 in the layered direction of the magnetic steel sheets. As a result, the plurality of magnetic steel sheets may have the same shape, to reduce manufacturing costs.

According to this embodiment, the rotor core 14 is provided with the through holes 18 to accommodate the permanent magnets 17 and the oil path 33 is formed with the use of gaps between the inner walls of each through hole 18 and the permanent magnet 17 accommodated in the through hole. Accordingly, there is no need of separately forming paths exclusive for cooling. This suppresses manufacturing costs.

Namely, the through holes 18 of the rotor 3 for accommodating the permanent magnets 17 are used to easily constitute the gap paths 35 to form the rotor coolant paths. Oil flowing through the gap path 35 between the through hole and the permanent magnet 17 comes in contact with the permanent magnet 17 serving as a maximum heat radiating source in the rotor 3, to efficiently cool the rotor 3.

According to this embodiment, a plurality of the oil paths 33 are formed inside the rotor 3 in the rotation direction of the rotor 3 and oil flowing directions among the plurality of oil paths 33 are differed from one another. More precisely, the oil flowing directions in the plurality of oil paths 33 are alternated in the circumferential direction of FIG. 2, to efficiently cool the rotor 3. The shape of the end rings 15 may be changed to optionally change that of the coolant paths to the permanent magnets 17.

According to this embodiment, the bearing 21 for rotatably supporting the rotor 3 with respect to the center shaft 4 is arranged adjacent to an outlet of the outlet path 39 formed in the end ring 15. Oil flowing out of the outlet path 39 has a lower temperature and a lower viscosity because the oil has taken heat away from the rotor 3, in particular, the permanent magnet 17. This reduces the frictional resistance and mechanical loss of the bearing 21 and improves the efficiency of the motor.

Namely, the oil that has flowed through the gap path 35 of the rotor coolant path has an increased temperature and a decreased viscosity due to heat radiation of the rotor 3. This oil passes as a lubricant through the inner space 21a of the bearing 21, to simultaneously realize the cooling of the rotor 3 and the suppression of stirring resistance of the bearing 21.

According to this embodiment, the inner face of the end ring 15 between the bearing 21 and the communication path 29 of the center shaft 4 is provided with the inner thread 31 that transports, according to the rotation of the rotor 3, oil on the bearing 21 side toward the communication path 29 of the center shaft 4. The inner thread 31 rotates as the rotor 3 rotates, to axially inwardly pressurize the oil. This prevents the oil from moving toward the bearing 21 and seals the oil. This sealing maintains the pressure in the clearance 28, to efficiently feed the oil to the inlet path 37 of the oil path 33 of the rotor 3.

Namely, when the rotor 3 rotates, the inner thread 31 of each end ring 15 forms an oil flow from the bearing 21 toward the inlet path 37. This oil flow substantially seals the clearance 28 in which oil to be supplied to the oil path 33 of the rotor 3 is present against the inner space 21a of the bearing 21 through which oil passed through the oil path 33 flows. With this, the oil in the clearance 28 always flows through the oil path 33 at first, and thereafter, flows into the inner space 21a of the bearing 21, thereby efficiently suppressing an increase in stirring resistance of the bearing 21.

An oil flow from the bearing 21 toward the inlet path 37 generated by the inner thread 31 is irrelevant to the rotation speed of the rotor 3. Accordingly, the sealing structure with the inner thread 31 is effective for a wide range of rotation speeds.

According to this embodiment, the stator seal 12 seals oil supplied to the stator 2 against the rotor 3. This prevents the oil from entering the air gap 16 and reduces a motor loss.

Second Embodiment

The second embodiment illustrated in FIG. 2 halves a rotor core 14 along a boundary that is at a center in the axial direction. Between the halved left and right rotor cores 14A and 14B and between left and right permanent magnets 17A and 17B, an intermediate ring 49 is interposed.

The intermediate ring 49 has a diametral path 49a serving as an entry extending in a radial direction and an axial path 49b axially extending to communicate with a diametral outer end of the diametral path 49a. The diametral path 49a has a diametral inner end opening communicating with an opening hole 27a formed in a sleeve 27.

Axial end openings of the axial path 49b communicate with gap paths (corresponding to the gap path 35 of FIG. 2) in through holes 18A and 18B of the rotor cores 14A and 14B that embed the permanent magnets 17A and 17B and correspond to the through hole 18 illustrated in FIG. 2.

The gap paths in the through holes 18A and 18B form an axial path that passes oil flowing into the diametral path 49a, i.e., the entry in axial outward directions.

According to this embodiment, each of left and right end rings 15 has an outlet path 39 that is similar to the outlet path 39 formed in the left end ring 15 of FIG. 1. An upstream end opening of the outlet path 39 communicates with the gap path in the through hole 18A (18B).

On an inner circumferential face of the sleeve 27 of the rotor 3, there is formed an inner thread 50 from an axial outer end of the sleeve 27 to the vicinity of the opening 27a, similar to the inner thread 31 formed on the inner face of the end ring 15, to constitute a seal at this location.

The remaining configuration of the second embodiment is the same as that of the first embodiment illustrated in FIGS. 1 and 2, and therefore, like structural elements are represented with like reference marks.

According to the motor cooling structure of the second embodiment having the above-mentioned configuration, oil introduced through end openings 26a and 26b into a rotor oil inlet path 26 of a center shaft 4 flows through a communication path 29, a clearance 28 on an outer circumference of the center shaft 4, and the opening hole 27a of the sleeve 27 into the diametral path 49a and axial path 49b in the intermediate ring 49. Thereafter, the oil in the intermediate ring 49 flows through the gap paths formed around the permanent magnets 17A and 17B in the through holes 18A and 18B, thereby cooling the heat generating permanent magnets 17A and 17B, like the first embodiment.

Like the first embodiment, the temperature increased oil after cooling flows from the outlet paths 39 toward bearings 21, to lubricate the bearings 21. Thereafter, the oil flows out of rotor oil discharge ports 32a into outer housings 5 and 6.

According to the second embodiment, the oil introduced into the rotor oil inlet path 26 of the center shaft 4 is supplied to the central part of the rotor 3 whose temperature easily rises and is passed from the central part to the axial outward directions. This more efficiently cools the rotor 3.

According to the second embodiment, the inner thread 50 is formed in the inner face of the sleeve 27, to form a thread seal that is axially longer than that of the first embodiment. This improves a sealing ability and increases pressure applied by the sealing mechanism in axial inward directions (directions toward the intermediate ring 49), so that, even if an initial pressure applied to the inside of the center shaft 4 is low, a high oil supply pressure is secured toward the intermediate ring 49 to increase an oil circulation efficiency and cooling efficiency.

Third Embodiment

Figure 4:
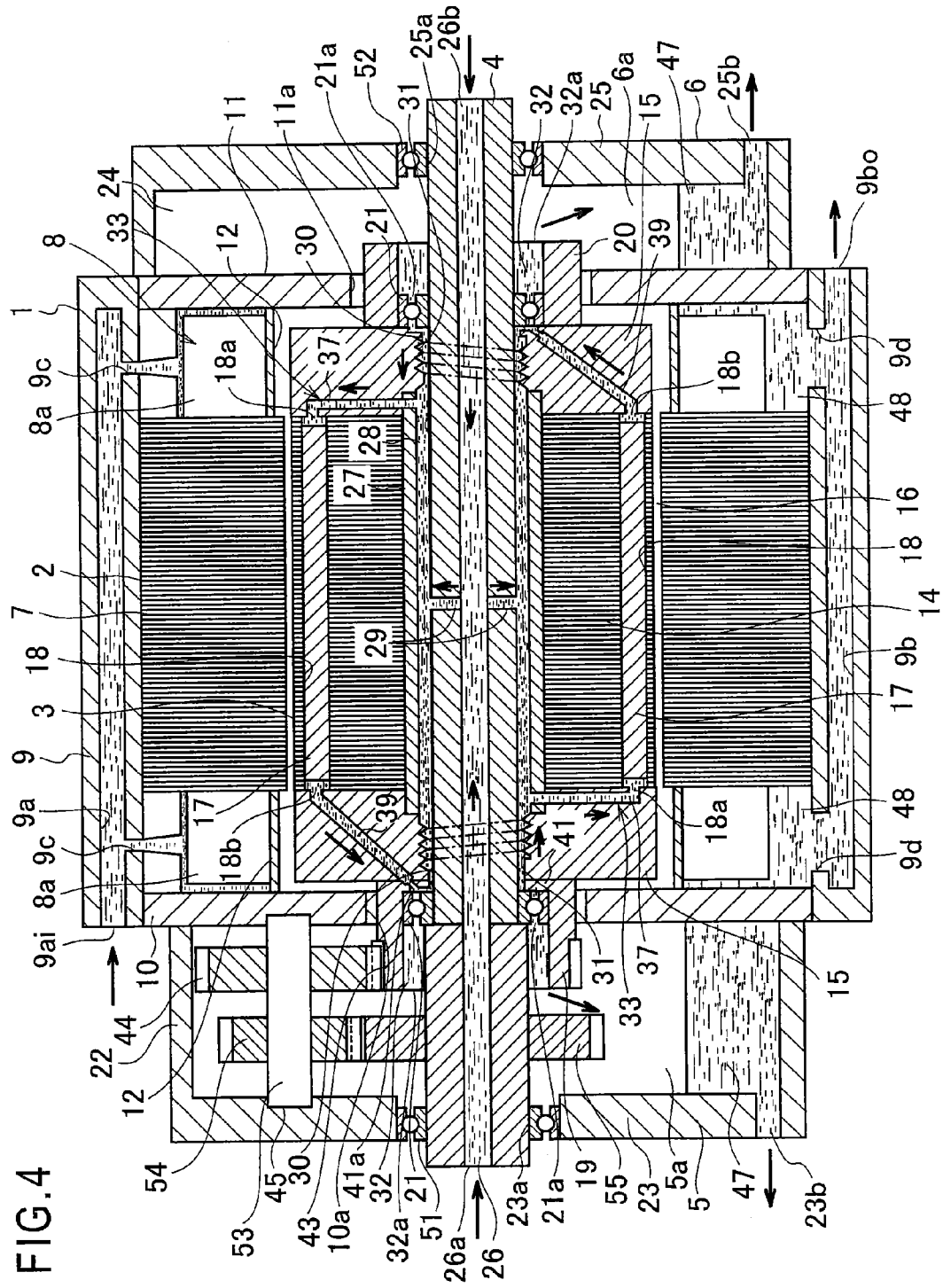
FIG. 4 is a sectional view illustrating a motor according to a third embodiment of the present invention

The third embodiment illustrated in FIG. 4 differs from the first embodiment illustrated in FIG. 1 in that a center shaft 4 is a rotary shaft that is rotatable through bearings 51 and 52 relative to outer side walls 23 and 25 of left and right outer housings 5 and 6. In addition, an output gear 44 is fixed to a counter shaft 53 whose ends are rotatably attached to a side wall 10 of an inner housing 1 and an outer side wall 23 of the outer housing 5. A counter shaft gear 54 is fixed to the counter shaft 53.

A center shaft gear 55 is fixed to the rotatable center shaft 4, so that the center shaft gear 55 meshes with the counter shaft gear 54.

According to this embodiment, the rotation of a rotor 3 turns the output gear 44, counter shaft 53, and counter shaft gear 54 in an opposite direction of the rotating direction of the rotor 3. At this time, the center shaft gear 55 meshing with the counter shaft gear 54 and the center shaft 4 turn in the same direction as the rotor 3.

As a result, the rotation speed of the rotor 3 is decreased or increased according to a gear ratio, to transmit driving force to the center shaft 4. Accordingly, the center shaft 4 can serve as an output shaft to transmit the driving force to the outside.

Fourth Embodiment

Figure 5:
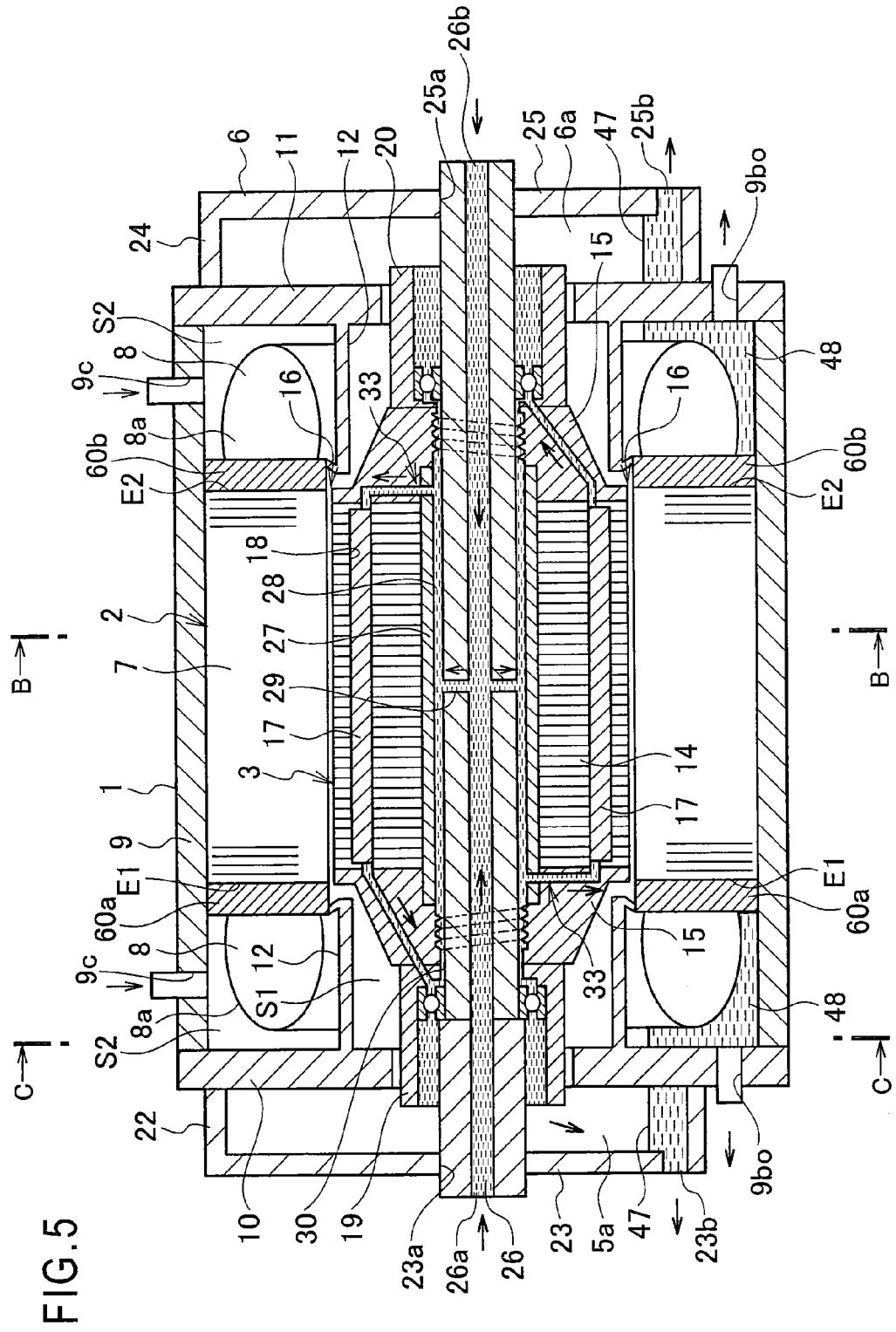
FIG. 5 is a sectional view illustrating a motor according to a fourth embodiment of the present invention.

A motor according to the fourth embodiment employs mold members 60a and 60b each to cover, as illustrated in FIG. 5, the surface of a base part of the coil end 8a adjacent to the stator core 7 of the rotary machine according to each of the first to third embodiments. This further improves the sealing of the air gap 16 against oil used to cool the coil ends 8a. FIG. 5 omits a motor rotation output system and partly omits paths for supplying and discharging oil to and from a stator 2. The detailed structure of the motor according to the fourth embodiment will be explained.

Figure 6:
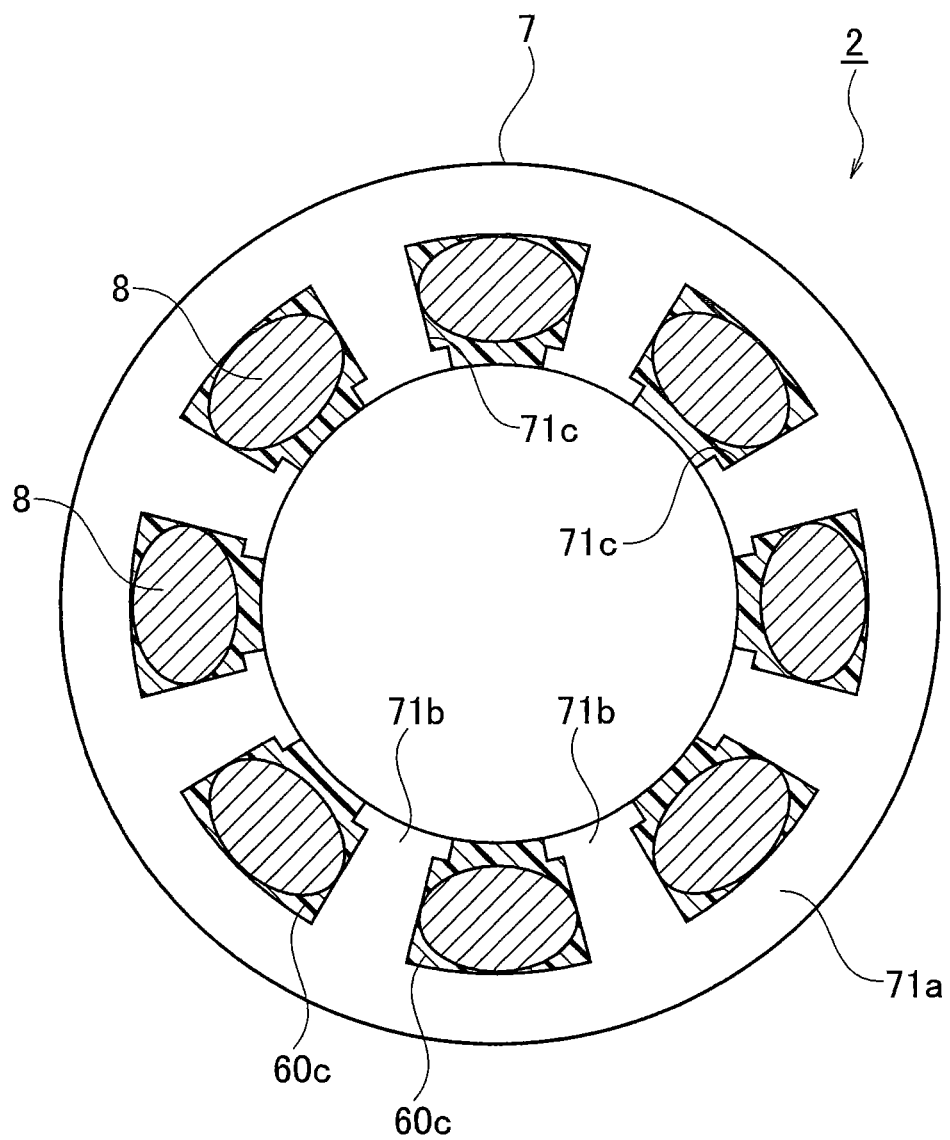
FIG. 6 illustrates a B-B section of a rotor and stator of FIG. 5

As illustrated in FIG. 6, the stator core 7 has an annular yoke 71a and teeth 71b that are arranged in a circumferential direction of the yoke 71a and protrude toward a center axis of the yoke 71a. A clearance between the adjacent teeth 71b is a slot 71c into which a coil 8 is inserted. To avoid complication, FIG. 6 illustrates the stator core 7 having eight teeth 71b and eight slots 71c. These numbers may optionally be set.

The teeth 71b of the stator core 7 function as magnetic poles by way of three-phase AC supplied to the coils 8 in the slots 71c. The stator core 7 is arranged around the rotor 3 so that the teeth 71b protrude toward a rotation axis of the center shaft 4. In this arrangement, a protrusion amount of the teeth 71b is set so that a gap between the teeth 71b and the rotor core 14 forms the air gap 16.

The coils 8 are inserted in the slots 71c formed in the stator core 7 and form magnetic poles according to an externally supplied current. The coils 8 include first coils to which a U-phase current of three-phase AC is supplied, second coils to which a V-phase current is supplied, and third coils to which a W-phase current is supplied. These first to third coils are sequentially arranged in the circumferential direction of the stator core 7. When three-phase AC is supplied to the coils 8, a rotating magnetic field is generated along an inner circumferential face of the stator core 7.

The coils 8 are attached to the stator core 7 so that the coil ends 8a protrude from each end of the stator core 7. Namely, as illustrated in FIG. 5, the coil ends 8a leftward protrude from a left end E1 of the stator core 7 and the coil ends 8a protrude from a right end E2 of the stator core 7. Every coil 8 is attached to the stator core 7 as mentioned above, and therefore, the coil ends 8a are circularly arranged along the ends E1 and E2 of the stator core 7.

The ends E1 and E2 of the stator core 7 are provided with the annular mold members 60a and 60b that extend along the ends E1 and E2 to cover base parts of the coil ends 8a. The reason why the mold members 60a and 60b cover only the base parts of the coil ends 8a instead of entirely covering the coil ends 8a is to realize cooling with cooling oil and prevent the cooling oil from entering the air gap 16 between the rotor 3 and the stator 2.

Namely, covering only the base parts of the coil ends 8a with the mold members 60a and 60b and exposing the remaining parts thereof realize that cooling oil is directly poured onto the exposed parts of the coil ends 8a, to efficiently cool the stator 2 (coils 8). As will be explained later in detail, front ends of stator seals 12 that are part of side walls 10 and 11 of the inner housing 1 are sealed with the mold members 60a and 60b, to separate a space S1 (first space) for arranging the rotor 3 from a space S2 (second space) for arranging the coil ends 8a, thereby preventing the oil from entering the air gap 16.

The thickness of the mold members 60a and 60b is determined in consideration of a sealing degree and cooling efficiency. If the front ends of the stator seals 12 are not sealed, the oil will enter the air gap 16. Accordingly, the thickness of the mold members 60a and 60b must be sufficient at least to seal the front ends of the stator seals 12. As the thickness of the mold members 60a and 60b increases, the exposed part of the coil ends 8a reduces to lower the cooling efficiency with oil. Accordingly, the thickness of the mold members 60a and 60b must be lower than a thickness capable of securing a necessary cooling efficiency. The thickness of the mold members 60a and 60b is, for example, about 50% of the protruding amount of the coil end 8a, preferably, about 20 to 30% of the protruding amount of the coil end 8a.

As illustrated in FIG. 6, the inside of the stator core 7 is provided with a mold member 60c, which is similar to the mold members 60a and 60b, to bury an inner gap of each slot 71c formed in the stator core 7. The mold member 60c is arranged to fix the coil 8 inserted in the slot 71c so as to prevent the coil 8 from vibrating in the slot 71c and improve the cooling efficiency of the coil 8.

When a current is applied, the coil 8 becomes a heat generating source, and therefore, the mold members 60a and 60b covering the base parts of the coil ends 8a and the mold member 60c fixing the coil 8 in the slot 71c are required to have a high thermal conductivity. It is preferable to form the mold members 60a, 60b, and 60c with thermally conductive resin mixed with thermally conductive fillers having an insulating characteristic, such as silicon oxide ($SiO_2$) and aluminum oxide ($Al_2O_3$).

The mold members 60a and 60b and the mold member 60c may be made of material having the same thermal conductivity, or materials having different thermal conductivities. Each coil 8 attached to the stator core 7 has a higher wire concentration (wires that form the coil 8) at part inserted in the slot 71c and a front end of the coil end 8a and a lower wire concentration at the base of the coil end 8a. Heat resistance is higher at the part where the wire concentration is low (the base of the coil end 8a) than at the part where the wire concentration is high (the inside of the slot 71c and the front end of the coil end 8a). Accordingly, it is preferable to form the mold members 60a and 60b with a material whose thermal conductivity is higher than that of a material used to form the mold member 60c.

In connection with the mold resin 60a and 60b formed at the ends E1 and E2 of the stator core 7, a viscosity when forming them may be given priority to a thermal conductivity after forming them. In this case, the mold resin 60a and 60b may be formed with a material that has a lower thermal conductivity and viscosity than those of a material used to form the mold member 60c. Such a material is required when the material for the mold member 60c is insufficient to fill gaps at the base part of the coil end 8a (gaps among the wires that form the coil 8).

In consideration of a functional difference between the mold members 60a and 60b and the mold member 60c, the mold members 60a and 60b and the mold member 60c may be formed from different materials. The mold members 60a and 60b are used to seal the front ends of the stator seals 12, and therefore, they may be formed with a material having resiliency after the material hardens. On the other hand, the mold member 60c must surely fix the coil 8 in the slot 71c, and therefore, it may be formed from a material that increases hardness after the material hardens.

An oil feed hole 9c (coolant supply port) formed in an inner wall of a cylindrical part 9 of the inner housing 1 is arranged at a plurality of locations in a rotation direction of the rotor 3 above the exposed parts of the coil ends 8a (the parts not covered with the mold member 60a and 60b) protruding from the ends E1 and E2 of the stator core 7.

Figure 7:
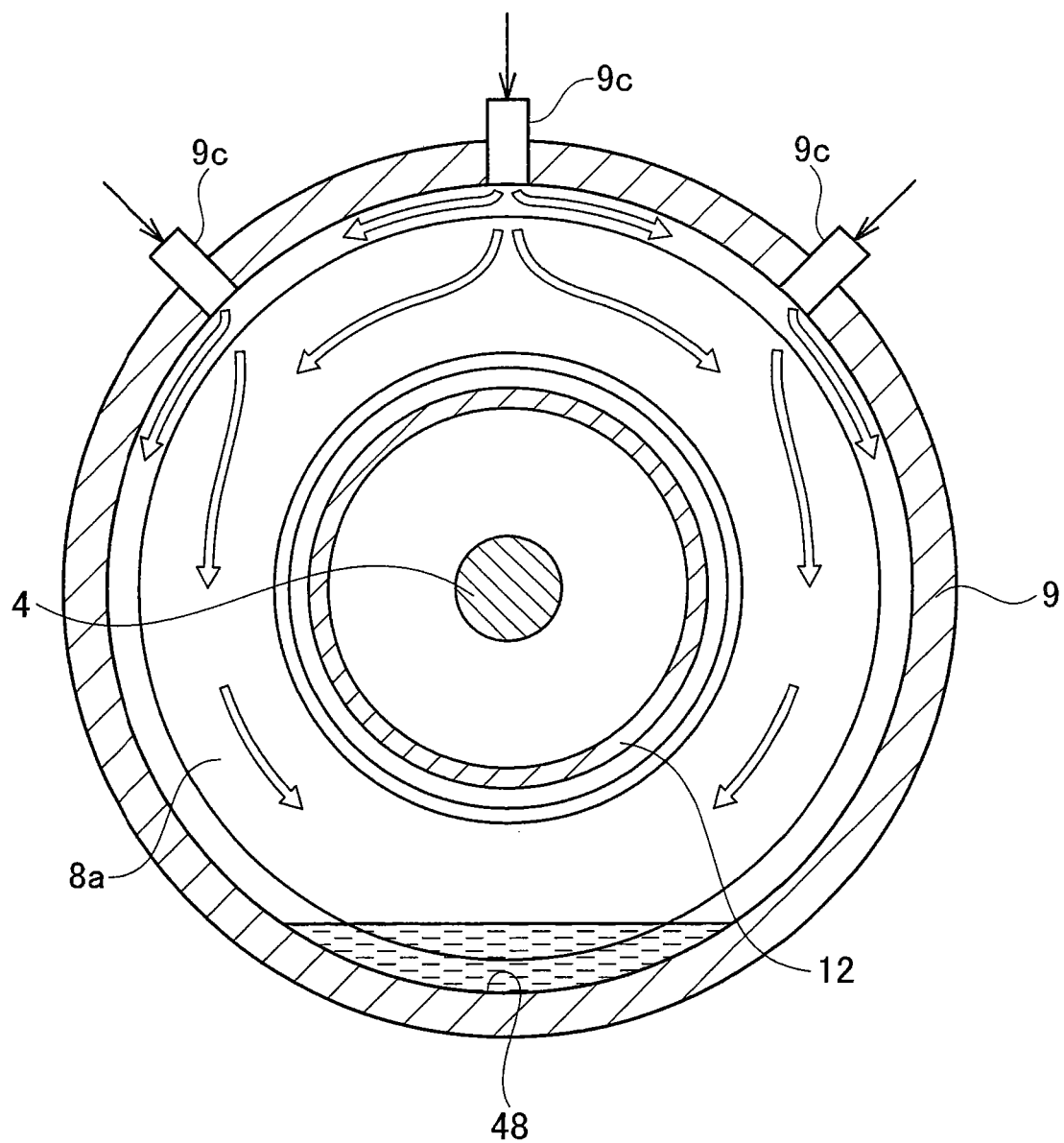
FIG. 7 illustrates a C-C section of FIG. 5

FIG. 7 is a sectional view taken along a C-C line of FIG. 5 viewed in an arrowed direction. As illustrated in FIG. 7, the oil feed holes 9c are arranged above the exposed parts of the coil ends 8a at three locations in the rotation direction of the center shaft 4. The oil feed holes 9c are arranged at intervals of, for example, 20 to 70° in the rotation direction of the rotor 3. Oil supplied from the oil feed holes 9c drops on different parts of the coil ends 8a and flows downward along the exposed parts of the coil ends 8a. The bottom of the cylindrical part 9 is an inner housing oil pool 48 where the oil downwardly moved along the exposed parts of the coil ends 8a is temporarily kept.

Compared with dropping oil only from one oil feed hole 9c, arranging the oil feed holes 9c at three locations in the rotation direction of the center shaft 4 and dropping oil from these oil feed holes 9c are able to spread oil over the whole of the exposed parts of the coil ends 8a, thereby improving cooling efficiency. Although the example illustrated in FIG. 7 is the oil feed holes 9c at three locations in the rotation direction of the rotor 3, the oil feed holes 9c may be formed at two locations or more than four locations in the rotation direction of the rotor 3 according to the size of the motor and the like. It is not always necessary to linearly arrange the oil feed holes 9c in the rotation direction of the rotor 3. They may be axially shifted from one another.

The stator seal 12 is integral with and protrudes from an inner side face of each of the side walls 10 and 11 of the inner housing 1. Each stator seal 12 has an outer diameter that is substantially equal to an inner diameter of the stator core 7 (mold member 60a). The front end of the stator seal 12 is in contact with the mold member 60a to separate the space S1 in which the rotor 3 is arranged from the space S2 in which the coil ends 8a are arranged. Namely, sealing the front end of the stator seal 12 with the mold member 60a results in separating the spaces S1 and S2 from each other.

FIG. 8 illustrates a sealing method with the stator seal 12 according to the fourth embodiment of the present invention. As mentioned above, the stator seals 12 are arranged on the side walls 10 and 11 and the front ends thereof are in contact with the mold members 60a and 60b and are sealed thereby. There will be various methods (sealing methods) of bringing the front ends of the stator seals 12 in contact with the mold members 60a and 60b as illustrated in FIG. 8. The sealing methods of sealing the stator seal 12 with the mold member 60a will be explained.

The sealing method illustrated in FIG. 8(a) tapers an outer circumferential face of the front end of the stator seal 12 and an inner circumferential face of the mold member 60a and wholly fits the front end of the stator seal 12 to the inner circumferential face of the mold member 60a, thereby increasing a contact area between the stator seal 12 and the mold member 60a. The sealing method illustrated in FIG. 8(b) tapers the outer circumferential face of the front end of the stator seal 12 and forms steps in the inner circumferential face of the mold member 60a and wholly fits the front end of the stator seal 12 to the inner circumferential face of the mold member 60a, thereby increasing contact locations between the stator seal 12 and the mold member 60a.

The sealing method illustrated in FIG. 8(c) forms a flange F at the front end of the stator seal 12 and a groove M in the inner circumferential face of the mold member 60a and fits the whole of the flange F formed at the front end of the stator seal 12 to the groove M formed in the inner circumferential face of the mold member 60a, thereby improving a sealing degree between the stator seal 12 and the mold member 60a. The sealing method illustrated in FIG. 8(d) forms a groove in the front end of the stator seal 12, arranges an O-ring R in the groove, and brings the whole of the O-ring R arranged at the front end of the stator seal 12 in contact with the inner circumferential face of the mold member 60a, thereby improving a sealing degree between the stator seal 12 and the mold member 60a.

The sealing method illustrated in FIG. 8(e) forms a protrusion Q wholly along the outer circumferential face of the front end of the stator seal 12 and wholly brings the protrusion Q in contact with the inner circumferential face of the mold member 60a, thereby improving a sealing degree between the stator seal 12 and the mold member 60a. The sealing method illustrated in FIG. 8(f) forms a notch K in the inner circumferential face of the mold member 60a and fits the front end of the stator seal 12 wholly to the notch K formed in the mold member 60a, thereby improving a sealing degree between the stator seal 12 and the mold member 60a.

Operation of the motor with the above-mentioned configuration will briefly be explained. When the motor is driven, a pump or the like (not illustrated) supplies cooling oil to the oil feed holes 9c and the oil drops onto a plurality of locations of the exposed parts of the coil ends 8a arranged in the space S2. The oil dropped on the coil ends 8a downwardly moves along the exposed parts of the coil ends 8a. Since the oil is dropped onto the plurality of locations of the coil ends 8a, the oil wholly spreads over the coil ends 8a arranged along the ends of the stator core 7, thereby efficiently cooling the coil ends 8a.

The stator seals 12 of the side walls 10 and 11 are sealed with the mold members 60a and 60b, so that, on the left and right sides of the stator core 7, the space S1 in which the rotor 3 is arranged and the space S2 in which the coil ends 8a are arranged are separated from each other. This prevents the oil supplied from the oil feed holes 9c into the space S2 from entering the air gap 16.

As mentioned above, this embodiment forms the mold members 60a and 60b at each end of the stator core 7, to cover the base parts of the coil ends 8a. In addition, the embodiment arranges the stator seals 12 in contact with the mold members 60a and 60b, to separate the space S1 in which the rotor 3 is arranged from the space S2 in which the coil ends 8a are arranged. This realizes efficient cooling without increasing costs or decreasing performance.

Fifth Embodiment

Figure 9:
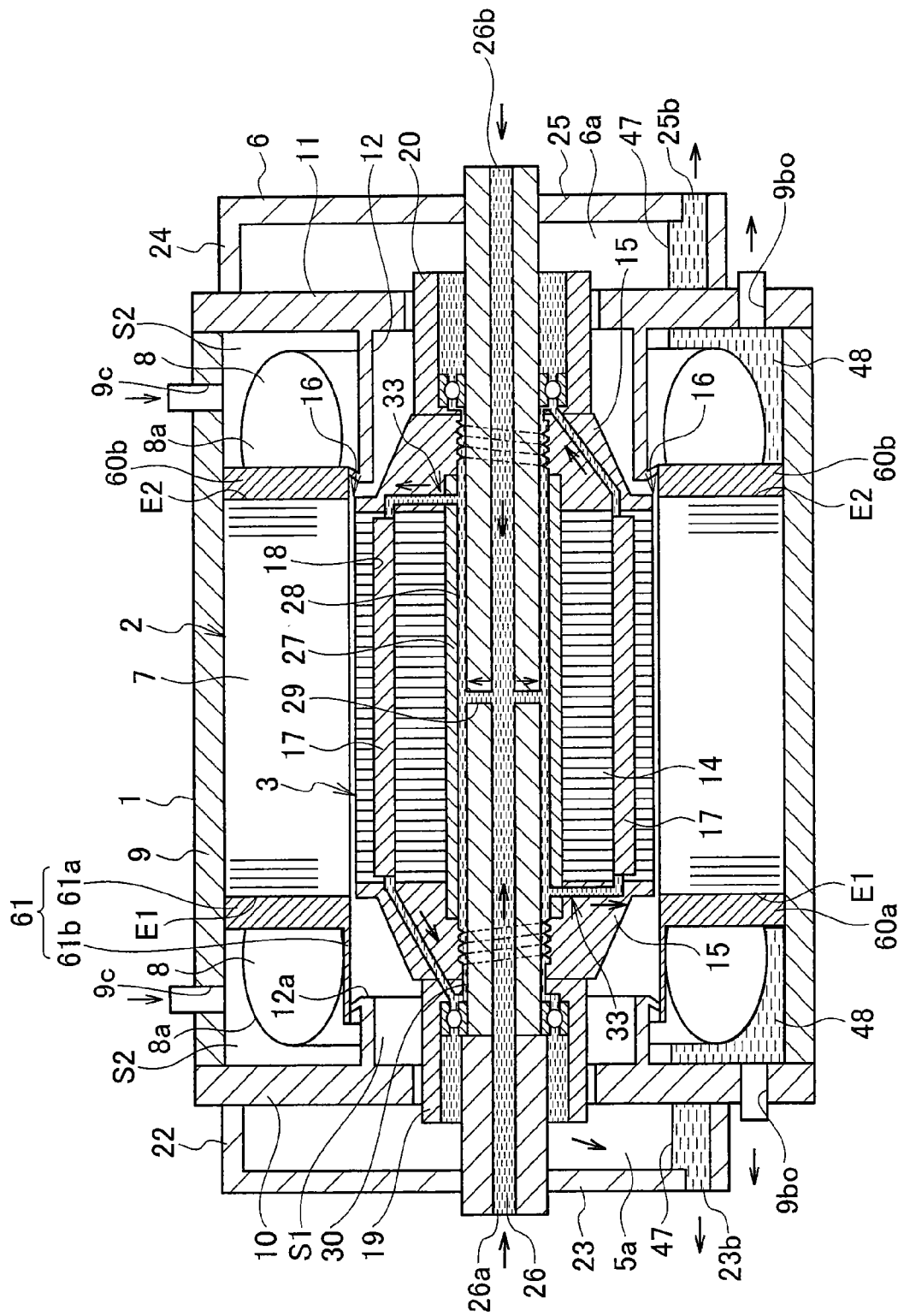
FIG. 9 is a sectional view illustrating a motor according to a fifth embodiment of the present invention

FIG. 9 is a sectional view illustrating the structure of a motor, i.e., a rotary machine according to the fifth embodiment of the present invention. The motor according to the embodiment illustrated in FIG. 9 differs from the motor according to the fourth embodiment illustrated in FIG. 5 in that the fifth embodiment employs a mold member 61 instead of the mold member 60a on the side wall 10 and integrally forms a stator seal 12a with the side wall 10, instead of the stator seal 12.

The mold member 61 is asymmetrical in shape about the axial direction of a center shaft 4 with respect to a mold member 60b formed on the right side of a stator core 7. More precisely, the mold member 61 has an annular part 61a that has an annular shape to cover a base part of each coil end 8a along an end E1 of the stator core 7 and a cylindrical protrusion 61b that protrudes leftward from the annular part 61a. The annular part 61a has the same shape as the mold member 60a illustrated in FIG. 5.

The stator seal 12a of the side wall 10 is shorter in axial length than a stator seal 12 on a side wall 11. This is because the mold member 61 has the cylindrical protrusion 61b protruding leftward from the annular part 61a, and therefore, the stator seal 12a comes in contact with the mold member 61 even if the length of the stator seal 12a does not reach the annular part 61a of the mold member 61.

According to this embodiment, the mold members 61 and 60b are formed on each end of the stator core 7 to cover the base part of each coil end 8a. Partitions 52b and 53c are arranged in contact with the mold members 61 and 60b, to separate a space S1 in which a rotor 3 is arranged from a space S2 in which the coil ends 8a are arranged. With this, this embodiment can carry out, like the first embodiment, efficient cooling without increasing costs or deteriorating performance.

Sixth Embodiment

Figure 10:
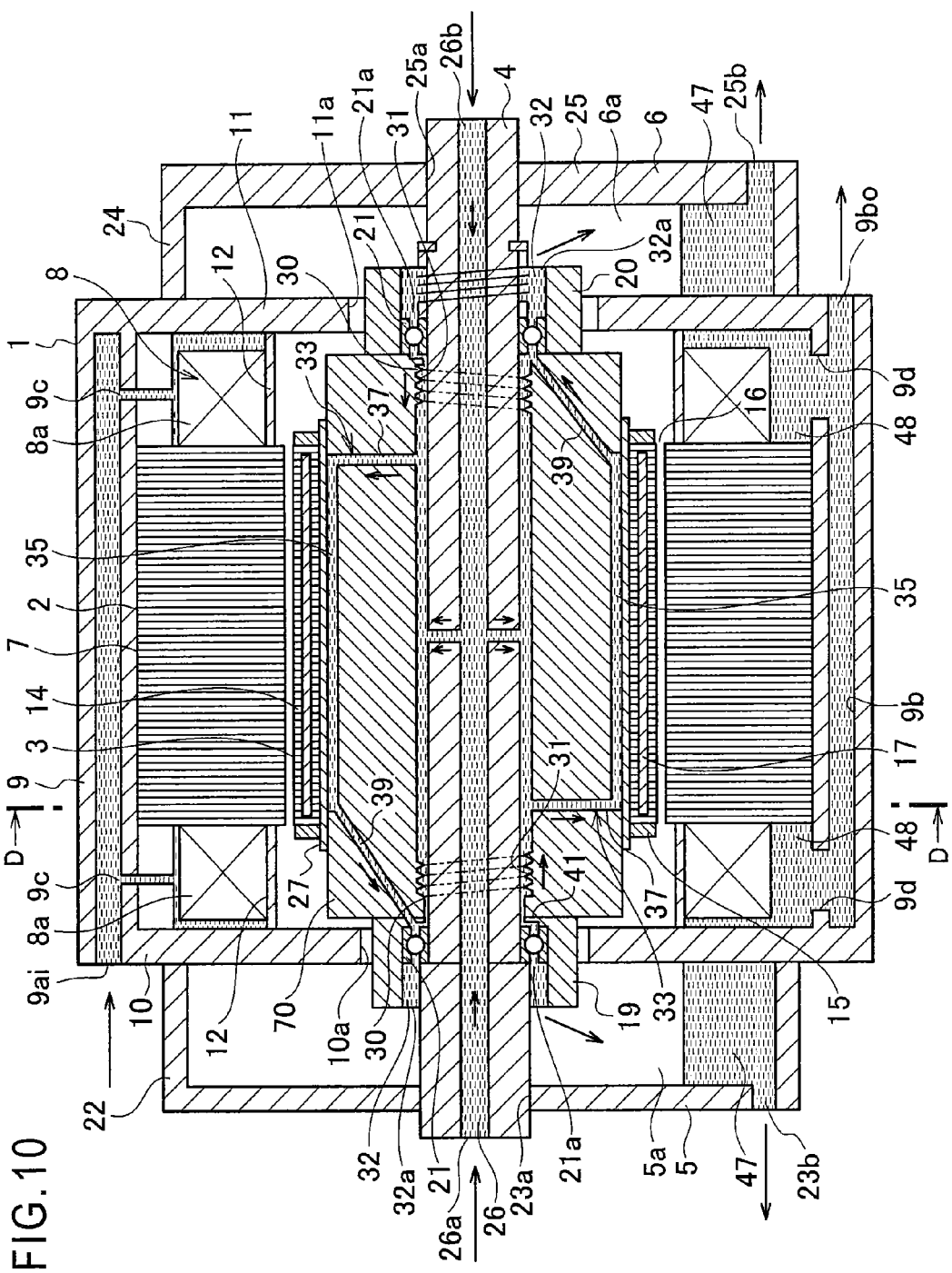
FIG. 10 is a sectional view illustrating a motor according to a sixth embodiment of the present invention

FIG. 10 is a sectional view illustrating the structure of a motor, i.e., a rotary machine according to the sixth embodiment of the present invention. The motor according to the sixth embodiment illustrated in FIG. 10 assumes an incident that any one of the first to fifth embodiments may deteriorate bonding force among the layered magnetic steel sheets of the rotor core 14 when the temperature of the rotor 3 increases, and to deal with the incident, improves an oil leakage preventive capacity with respect to the air gap 16. In FIG. 10, the motor torque output system and the like are omitted. The detailed structure of the motor of the sixth embodiment will be explained.

According to this embodiment, the outer and inner diameters of a cylindrical sleeve (annular sleeve) 27 are larger than those of the first to fifth embodiments, to shorten a rotor core 14 and an end ring 15 in a diametral direction. The sleeve 27 is attached to an outer circumferential face of a cylindrical rotary body (second rotary body) 70 that is a part of a rotor 3. On an outer circumferential face of the sleeve 27, there are attached the rotor core 14 and end ring 15.

According to this embodiment, an oil path 33 of the rotor 3 is formed in the rotary body 70 as will be explained later, instead of in the rotor core 14 and end rings 15. In addition, this embodiment forms an inner thread 31 in an inner circumferential face of the rotary body 70 in the vicinity of each bearing 21, instead of in the inner circumferential faces of the left and right end rings 15.

To each end face of the rotary body 70, rotary support members (first rotary bodies) 19 and 20 are attached with their center axis being aligned with each other. The rotary support members 19 and 20 form, with respect to the center shaft 4, an annular gap (first path) 32 for guiding oil in the axial direction of the center shaft 4. The rotary body 70 has a larger diameter than that of the rotary support members 19 and 20.

In an outer circumferential face of the rotary body 70, there is formed a groove (recess) 35c that forms with an inner circumferential face of the sleeve 27 a gap path (coolant path) 35 of the oil path 33. According to this embodiment, there are formed eight grooves 35c having a rectangular sectional shape at regular intervals in a circumferential direction of the rotary body 70.

Figure 12:
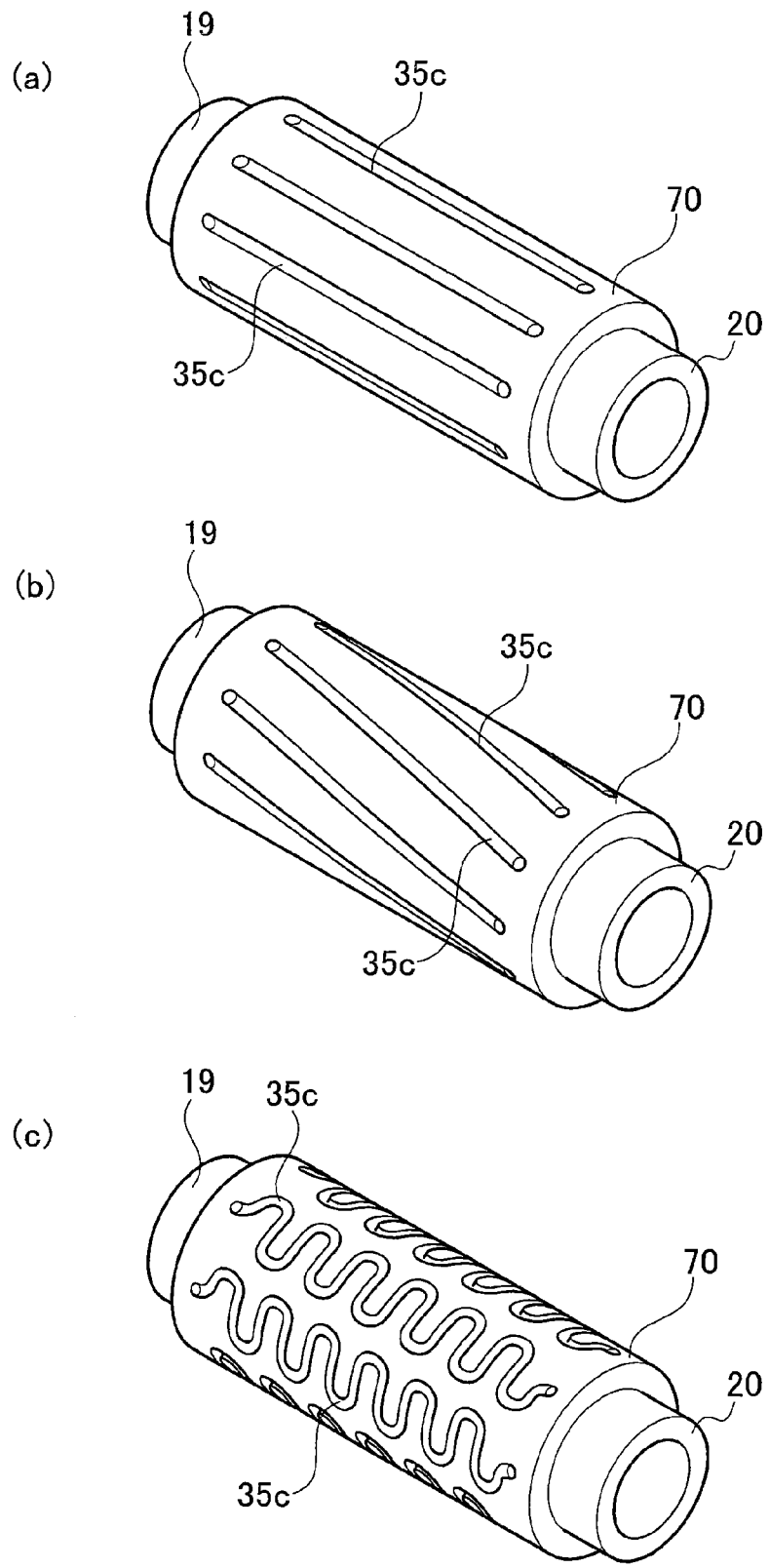
FIG. 12 is perspective views of examples of a rotor of FIG. 10

FIG. 12 is a perspective view illustrating examples of the rotary body 70 of the rotor 3 according to an embodiment of the present invention. In FIG. 12(a), the groove 35c linearly extends in the axial direction and is formed in the rotary body 70. The groove 35c does not reach each axial end of the rotary body 70 but it extends from the vicinity of one axial end of the rotary body 70 to the vicinity of the other axial end. This is to at most prevent oil supplied to the groove 35c of the gap path 35 from leaking outside through a gap between the rotary body 70 and the sleeve 27.

The groove 35c formed in the outer circumferential face of the rotary body 70 may be spiral in the axial direction as illustrated in FIG. 12(b), or may be winding in the axial direction as illustrated in FIG. 12(c). When the groove 35c is spiral as illustrated in FIG. 12(b), a circumferential temperature distribution of the rotor 3 will be more equalized compared with the linear groove 35c illustrated in FIG. 12(a). When the groove 35c is winding as illustrated in FIG. 12(c), the cooling efficiency of the rotor 3 will improve compared with the linear groove 35c illustrated in FIG. 12(a).

FIG. 13 illustrates sectional shapes of grooves formed in a rotary shaft of a motor, i.e., a rotary machine according to an embodiment of the present invention. According to this embodiment, the groove 35c has a rectangular sectional shape and is formed in the outer circumferential face of the rotary body 70 of the center shaft 4 as illustrated in FIG. 13(a). The sectional shape of the groove 35c may be an arc shape (a convex arc toward a rotation axis) as illustrated in FIG. 13(b), or a triangular shape (with one vertex oriented toward the rotation axis) as illustrated in FIG. 13(c).

Instead of forming a plurality of the thin and long axial grooves 35c in the circumferential direction of the rotary body 70 as illustrated in FIGS. 13(a) to 13(c), the outer circumferential face of the rotary body 70 may generally be recessed as illustrated in FIG. 13(d). Namely, the outer circumferential face of the rotary body 70 except axial ends thereof may generally be hollowed to form a recess. Such a recess may be realized by forming, for example, a large number of the linear grooves 35c of FIG. 13(a) in the circumferential direction.

Figure 11:
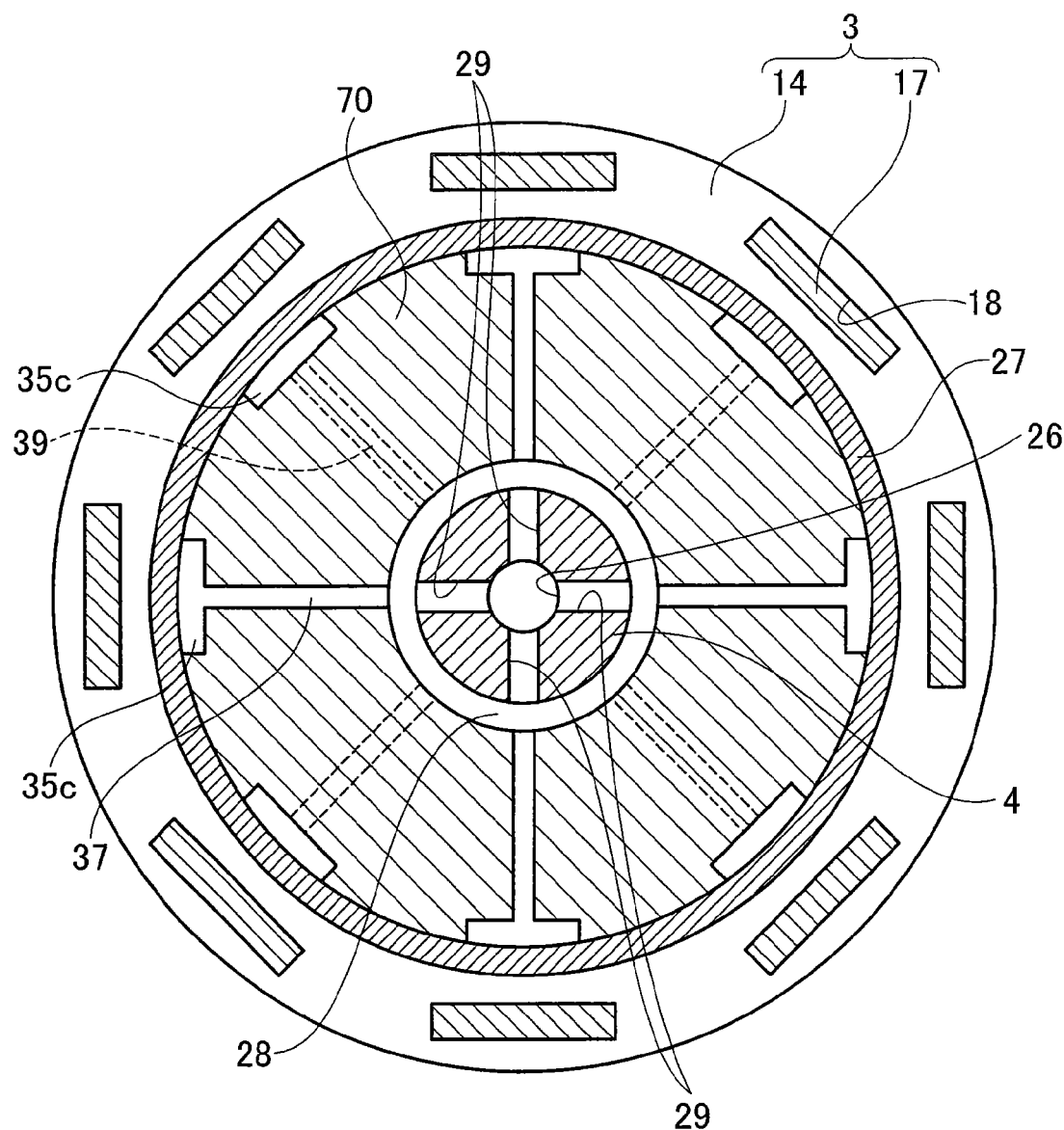
FIG. 11 illustrates a D-D section of FIG. 10

Inside the rotary body 70, there are formed an inlet path 37 and outlet path (second path) 39 to connect an annular clearance 28, which is formed between an inner circumferential face of the rotary body 70 and an outer circumferential face of the center shaft 4, to the groove 35c formed in the outer circumferential face of the rotary body 70. As illustrated in FIG. 11, the inlet paths 37 and outlet paths 39 are formed to extend in diametral directions of the rotary body 70 (more precisely, in different four directions) from the clearance 28 toward the groove 35c.

The oil path 33 formed with the gap path 35, inlet path 37, and outlet path 39 is formed in plurality for through holes (accommodation holes) 18 accommodating permanent magnets 17 in a circumferential direction. As illustrated in FIG. 10, each oil path 33 includes the gap path 35, i.e., the groove 35c formed in the outer circumferential face of the rotary body 70 adjacent to the permanent magnet 17 in the through hole 18, the inlet path (entry) 37 formed upstream from the gap path 35, and the output path 39 formed in the rotary body 70 downstream from the gap path 35.

The inlet path 37 extends in a radial direction of the center shaft 4 on the axially center side of the inner thread 31 formed in the inner circumferential face of the rotary body 70. A downstream end of the inlet path 37 communicates with an end of the groove 35c. On the other hand, the outlet path 39 has an upstream end communicating with the other end of the groove 35c and obliquely extends in the rotary body 70 from the communicating location toward the bearing 21. A downstream end of the outlet path 39 is open around an axially inner side of the bearing 21. Accordingly, an inner space 21a of the bearing 21 communicates with the outlet path 39. The oil path 33 including the outlet path 39, the inner space 21a of the bearing 21, and a rotor oil discharge port 32a form a rotor coolant path.

The plurality of oil paths 33 formed in the circumferential direction of the rotary body 70 are arranged to alternate the positions of the inlet paths 37 and outlet paths 39 in the axial direction of the rotary body 70. Accordingly, oil flowing through the gap paths 35 of the oil paths 33 are divided into two systems, one flowing from the surface of FIG. 11 to the back face thereof and one flowing from the back face of FIG. 11 to the surface thereof that alternate in the circumferential direction.

The rotary body 70 is positioned relative to the rotor core 14 so that, as illustrated in FIG. 11, each groove 35c formed in the outer circumferential face of the rotary body 70 is closest to the permanent magnet 17 of the rotor core 14. This is to bring the groove 35c of the gap path 35 for guiding oil as close as possible to the permanent magnet (heat generating source) 17 so as to improve the cooling efficiency of the rotor 3.

The rotor 3 has the rotor core 14, permanent magnets 17, and end rings 15, and with the sleeve 27, is attached to the rotary body 70. With the rotary body 70, the rotor 3 is rotatable around the center shaft 4. As illustrated in FIG. 10, the rotor core 14 is formed by layering a plurality of magnetic steel sheets made of magnetic material with an adhesive. The rotary core 14 is annular and the rotary body 70 and sleeve 27 are inserted into a central part of the rotor core 14.

The end rings 15 are arranged at each axial end (in the magnetic steel sheet layered direction) of the rotor core 14 and are annular to axially hold the rotor core 14 between them. An axial length of the rotor core 14 including the thickness of each end ring 15 arranged at each axial end of the rotor core 14 is set to be equal to an axial length of the rotary body 70.

The sleeve 27 is an annular member arranged between the rotary body 70 and the rotor 3 and is made of the same material as, for example, the center shaft 4 and rotary body 70. An axial length of the sleeve 27 is set to be equal to the axial length of the rotary body 70. The sleeve 27 is fitted to the outer circumferential face of the rotary body 70 by, for example, shrinkage fitting. Fitting the sleeve 27 to the outer circumferential face of the rotary body 70 results in forming the gap paths 35 with the grooves 35c between the rotary body 70 and the sleeve 27.

Oil guided into the grooves 35c or the gap paths 35 flows between the rotary body 70 and the sleeve 27. Even if a temperature increase of the motor deteriorates the bonding strength of the adhesive that fixes the magnetic steel sheets of the rotor core 14 together and even if the rotor 3 is rotated in this state at high speed, the oil guided into the grooves 35c or the gap paths 35 is prevented from leaking. The rotor core 14 is fitted to the outer circumferential face of the sleeve 27 by, for example, shrinkage fitting.

Since the sleeve 27 is fitted to the outer circumferential face of the rotary body 70 by, for example, shrinkage fitting, there is substantially no leakage of the oil guided into the grooves 35c. If the pressure of the oil guided into the grooves 35c is high, there may be a risk of leakage of the oil. For this, at each axial end, it is preferable to solder or weld the sleeve 27 to the rotary body 70, or arrange a sealing material such as an O-ring between the sleeve 27 and the rotary body 70.

Operation of the motor with the above-mentioned configuration will briefly be explained. When the motor is driven, oil is supplied by a pump or the like (not illustrated) from end openings 26a and 26b of the center shaft 4 into a rotor oil inlet path 26. The oil flows from communication paths 29 into the clearance 28 on the outer circumference of the center shaft 4 and axially outwardly flows through the clearance 28. Thereafter, the oil flows into each inlet path 37 in the vicinity of the inner thread 31. At this time, the oil flowing through the clearance 28 toward the inlet paths 37 is axially inwardly pressurized due to the rotation of the inner thread 31 caused by the rotation of the rotor 3. This prevents the oil from axially outwardly moving toward the bearings 21. Namely, the oil is sealed.

Due to the sealing, the pressure of the oil in the clearance 28 is maintained, and due to the pressure, the oil flows from the clearance 28 into the inlet paths 37. The oil flowed into each inlet path 37 is guided into the groove 35c formed in the outer circumferential face of the rotary body 70. Between the rotary body 70 and the sleeve 27, the groove 35c forms the gap path 35, and therefore, the oil in the groove 35c cools the permanent magnet 17. Here, the gap path 35 is arranged to be closest to the permanent magnet 17 arranged in the rotor core 14, to efficiently cool the rotor core 14 and permanent magnet 17. The oil passed through the gap path 35, i.e., the groove 35c flows through the outlet path 39 to around the bearing 21 and enters the inner space 21a to lubricate the bearing 21.

As mentioned above, this embodiment forms the grooves 35c in the outer circumferential face of the rotary body 70 of the rotor 3, to serve as the gap paths 35 for guiding oil. Between the rotary body 70 in which the grooves 35c are formed and the rotor core 14, the annular sleeve 27 is arranged, so that oil introduced into the grooves 35c flows between the rotary body 70 and the sleeve 27. Even if the motor increases its temperature to deteriorate the bonding strength of the adhesive for fixing the magnetic steel sheets of the rotor core 14 together and even if the rotor 3 is rotated in this state at high speed, the coolant guided into the grooves 35c is prevented from leaking.

This embodiment forms the grooves 35c in the outer circumferential face of the rotary body 70 whose diameter is larger than that of the rotary support members 19 and 20 and arranges the sleeve 27 between the rotary body 70 having the grooves 35c and the rotor core 14, to form the coolant paths in the vicinities of the permanent magnets 17. This easily and efficiently cools the rotor 3 including the permanent magnets 17.

The number, length, shape (including sectional shape) of the grooves 35c formed in the outer circumferential face of the rotary body 70 are not limited to those mentioned above. In addition, the arrangement in a rotation direction (circumferential direction) of the grooves 35c in the outer circumferential face of the rotary body 70 and the permanent magnets 17 in the rotor core 14 and a positional relationship between them are not limited to those mentioned above. Optional arrangements and positional relationships are employable.

Although the rotary support members 19 and 20 and rotary body 70 are integrally formed according to the above-mentioned embodiment, the rotary support members 19 and 20 and the rotary body 70 may be separate members.

Figure 14:
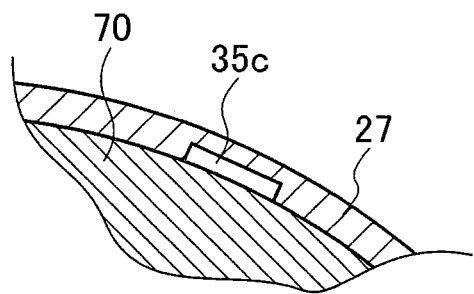
FIG. 14 is a sectional view illustrating a sectional shape of a groove formed in a sleeve of FIG. 10
Figure 15:
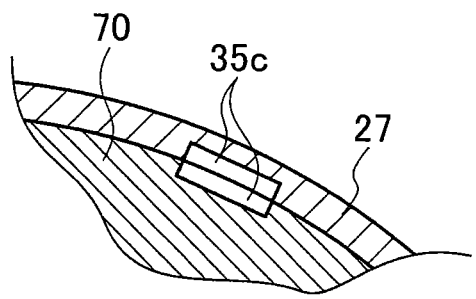
FIG. 15 is a sectional view illustrating sectional shapes of grooves formed in the rotor and sleeve of FIG. 10

Although the grooves 35c, i.e., the recesses to form the gap paths 35 are formed in the outer circumferential face of the rotary body 70 according to the above-mentioned embodiment, the grooves 35c may be formed in the inner circumferential face of the sleeve 27 as illustrated in FIG. 14, or in each of the outer circumferential face of the rotary body 70 and the inner circumferential face of the sleeve 27 as illustrated in FIG. 15.

INDUSTRIAL APPLICABILITY

The present invention is applicable not only to motors of electric vehicles but also generally and widely to rotary machines that convert electric power into torque, or rotary machines such as generators that convert torque into electric power.

REFERENCE SIGNS LIST

1: Inner housing (Housing)
2: Stator
3: Rotor
4: Center shaft (Rotor shaft)
5, 6: Outer housing
5a, 6a: Space between inner housing and outer housing (Space between housing and outer housing)
7: Stator core
8: Coil
8a: Coil end
9c: Oil feed hole (Coolant supply port)
12, 12a: Stator seal (Sealing material, Partition)
14, 14A, 14B: Rotor core
15: End ring (End member)
17, 17A, 17B: Permanent magnet
18: Through hole of rotor core (Accommodation hole for accommodating permanent magnet)
19, 20: Rotary support member (First rotary body)
21: Bearing for rotatably supporting rotor with respect to center shaft
21a: Inner space of bearing (Rotor coolant path)
26: Rotor oil inlet path (Rotor shaft coolant path)
26a, 26b: End opening (Inlet)
27: Sleeve
28: Clearance between rotor and center shaft (Annular clearance)
29: Communication path (Exit)
31: Inner thread in inner circumferential face of end ring (Spiral groove)
32: Gap (First path)
32a: Rotor oil discharge port (Discharge port of rotor coolant path)
33: Oil path in rotor (Rotor coolant path)
35: Gap path (Coolant path)
35c: Groove
37: Inlet path (Second path)
39: Outlet path (Rotor coolant path, Second path)
49a: Diametral path
49b: Axial path
60a, 60b, 60c, 61: Mold member
S1: First space
S2: Second space
61a: Annular part
61b: Protrusion
70: Rotary body (Second rotary body)

The invention claimed is:

1. A rotary machine comprising:
   a housing in which a stator is fixed;
   an outer housing attached to an outer side of the housing;
   a rotor shaft that horizontally passes through the housing and has both ends fixed to the outer housing;
   a rotor that is arranged inside the housing, is supported to be rotatable relative to the rotor shaft, and is rotated by the stator;
   a rotor shaft coolant path formed inside the rotor shaft and including an inlet exposed to the outside of the outer housing to take in a coolant from the outside of the rotor shaft and an exit communicating with an annular clearance between the rotor shaft and the rotor for passing the coolant taken in from the inlet to the annular clearance; and
   a rotor coolant path formed inside the rotor and including an intake communicating with the annular clearance and a discharge port arranged outside the housing for discharging the coolant taken through the intake to a space between the housing and the outer housing.

2. The rotary machine as set forth in claim 1, further comprising
   an accommodation hole formed inside the rotor and accommodating a permanent magnet,
   wherein the rotor has a rotor core whose ends in an axial direction of the rotor shaft are held between a pair of end rings,
   the rotor coolant path includes:
   an inlet path and an outlet path that are formed inside the pair of end rings and communicate with the intake and discharge port; and
   a gap path that is formed between the accommodation hole and the permanent magnet and interconnects the inlet path and the outlet path to each other.

3. The rotary machine as set forth in claim 1, wherein
   a plurality of rotor coolant paths are arranged at intervals in a rotation direction of the rotor, to pass the coolant in different directions along the rotor shaft.

4. The rotary machine as set forth in claim 1, further comprising
   a bearing that rotatably supports the rotor with respect to the rotor shaft and has an end face arranged outside the housing, wherein
   the rotor coolant path includes an inner space that is defined inside the bearing, open to the end face, communicates with the discharge port, and passes the coolant that has passed through an outlet path.

5. The rotary machine as set forth in claim 4, wherein
   the rotor has a rotor core whose ends in an axial direction of the rotor shaft are held between a pair of end rings,
   the bearing is attached to an outer side in the axial direction of an end ring,
   an inner circumferential face of each of the end rings has a spiral groove, the rotor shaft passes through the end ring, the inner circumferential face is opposed to a circumferential face of the rotor shaft, and wherein the spiral groove is configured to move the coolant in the annular clearance from the bearing toward the intake by way of the rotation of the rotor.

6. The rotary machine as set forth in claim 1, wherein
   the rotor coolant path includes a diametral path arranged in the rotor is central in the axial direction of the rotor shaft and extends in a diametral direction of the rotor shaft and a pair of axial paths that communicate with the diametral path and extend up to axial ends of the rotor.

7. The rotary machine as set forth in claim 1, wherein:
the stator includes a stator core and a coil that is attached to the stator core so that a coil end protrudes from each end of the stator core and the rotary machine further comprises:
a mold member that is formed at each end of the stator core so as to cover a base part of the coil end; and
a partition that is in contact with the mold member and separates a first space in which the rotor is arranged from a second space in which the coil end is arranged.

8. The rotary machine as set forth in claim 7, further comprising:
a mold member formed inside the stator core to fill a gap inside a slot that is formed in the stator core to accommodate the coil, wherein
the mold member formed at each end of the stator core and the mold member formed inside the stator core are made of materials having different thermal conductivities.

9. The rotary machine as set forth in claim 1, wherein
the rotor has a rotary body rotatably supported with respect to the rotor shaft and a sleeve attached to an outer circumferential face of the rotary body,
an outer circumferential face of the sleeve is attached to a rotor core formed by layering a plurality of magnetic steel sheets, and
a recess serving as a coolant path for guiding the coolant is formed in at least one of the outer circumferential face of the rotary body and an inner circumferential face of the sleeve.

10. The rotary machine as set forth in claim 9, wherein
the rotary body has a first rotary body that has a first path for axially guiding the coolant and a second rotary body that has a larger diameter than the first rotary body and contains an internal second path to connect the first path to the recess coolant path and the recess is formed in an outer circumferential face of the second rotary body.

11. The rotary machine as set forth in claim 9, wherein
the recess is formed in the same number as the number of the permanent magnets arranged in the rotor.

12. The rotary machine as set forth in claim 11, wherein
the rotary body and sleeve are positioned in the rotation direction of the rotor so that the recesses come as close as possible to the permanent magnets, respectively.

\* \* \* \* \*